US010581553B2

(12) United States Patent
Fireaizen et al.

(10) Patent No.: US 10,581,553 B2
(45) Date of Patent: Mar. 3, 2020

(54) SIGNAL DETECTION BY MEANS OF SUPPLEMENTAL INFORMATION

(71) Applicant: Elta Systems Ltd., Ashdod (IL)

(72) Inventors: Moshe Fireaizen, Halamish (IL); Moshe Nahaman, Mazkeret Batia (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/234,008

(22) Filed: Dec. 27, 2018

(65) Prior Publication Data

US 2019/0207706 A1 Jul. 4, 2019

(30) Foreign Application Priority Data

Dec. 31, 2017 (IL) .......................... 256677

(51) Int. Cl.
| | |
|---|---|
| *H04L 1/00* | (2006.01) |
| *H04L 25/49* | (2006.01) |
| *G01S 5/02* | (2010.01) |
| *H04W 84/18* | (2009.01) |
| *H04W 40/22* | (2009.01) |

(Continued)

(52) U.S. Cl.
CPC .............. *H04L 1/0036* (2013.01); *G01S 5/02* (2013.01); *H04W 40/22* (2013.01); *H04W 84/18* (2013.01); *H04W 88/04* (2013.01); *H04L 25/4902* (2013.01); *H04W 84/047* (2013.01)

(58) Field of Classification Search
CPC ... H04W 60/04; H04L 1/0036; H04L 25/4902
See application file for complete search history.

(56) References Cited

U.S. PATENT DOCUMENTS

| | | | |
|---|---|---|---|
| 6,735,630 B1 | 5/2004 | Gelvin et al. | |
| 9,098,017 B2* | 8/2015 | Hamakawa | ........ G03G 15/0889 |

(Continued)

OTHER PUBLICATIONS

Radhakrishnan, R., Edmonson, W. W., Afghah, F., Rodriguez-Osorio, R. M., Pinto, F., & Burleigh, S. C. (2016). Survey of inter-satellite communication for small satellite systems: Physical layer to network layer view. IEEE Communications Surveys & Tutorials, 18(4), 2442-2473.

(Continued)

*Primary Examiner* — Sung S Ahn
(74) *Attorney, Agent, or Firm* — Browdy and Neimark, PLLC

(57) ABSTRACT

A method of communicating information from a sensor concerning a received signal, comprising: responsive to receiving by at least one detecting sensor, during a defined time interval, data indicative of an entire data of a frequency band received by it during the defined time interval, comprising at least one signal emitted at least one emitter, and to detecting of the emitted signal by the at least one detecting sensor, sending from the sensor assistance information corresponding to the detected emitted signal during the defined time interval, to at least one non-detecting sensor. This information can be utilized by the non-detecting sensor to perform an action with respect to data indicative of an entire data of the frequency band received by the non-detecting sensor during a corresponding defined time interval, the action corresponding to at least one emitted signal received by the non-detecting sensor during the corresponding defined time interval.

20 Claims, 18 Drawing Sheets

(51) Int. Cl.
H04W 88/04 (2009.01)
H04W 84/04 (2009.01)

(56) References Cited

U.S. PATENT DOCUMENTS

2007/0262863 A1* 11/2007 Aritsuka ............... H04B 17/27
340/539.22
2009/0285119 A1 11/2009 Horn et al.
2017/0030996 A1 2/2017 Fireaizen et al.

OTHER PUBLICATIONS

Sun, R., Guo, J., Gill, E. K. A., & Maessen, D. C. (2012). Potentials and limitations of CDMA networks for combined inter-satellite communication and relative navigation. International Journal on Advances in Telecommunications, 5(1-2), 2012.

* cited by examiner

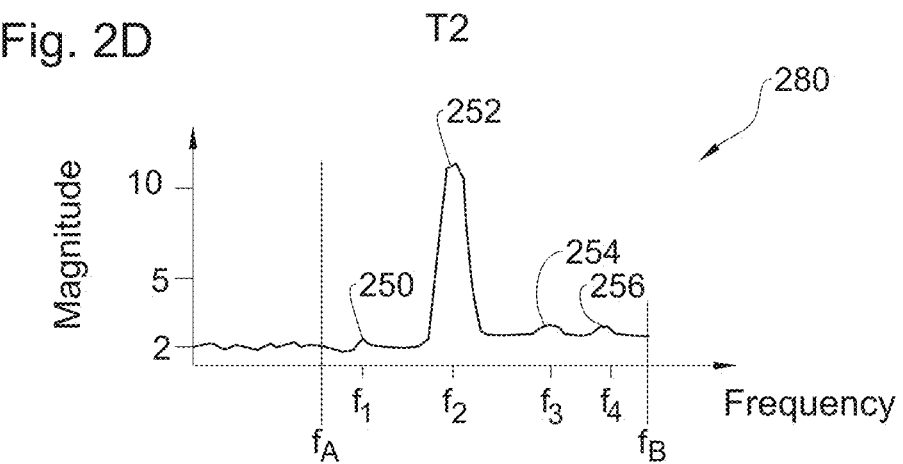
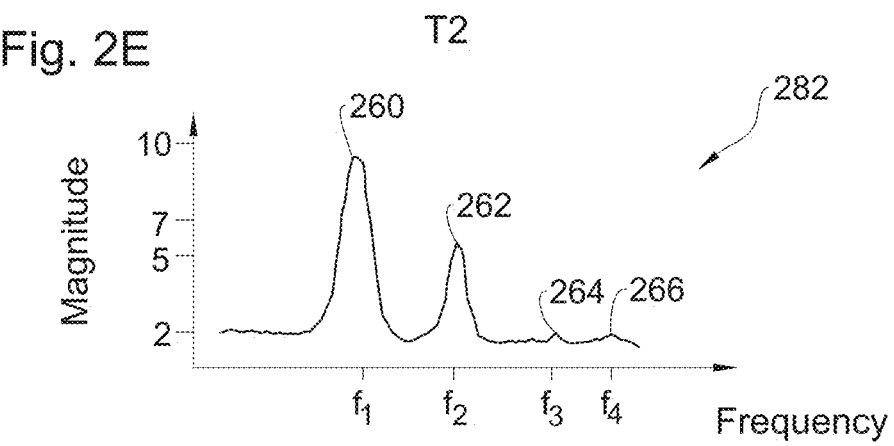
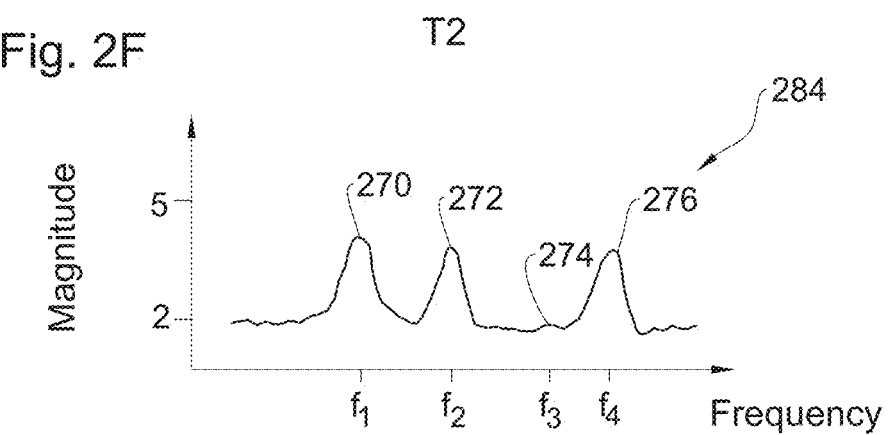

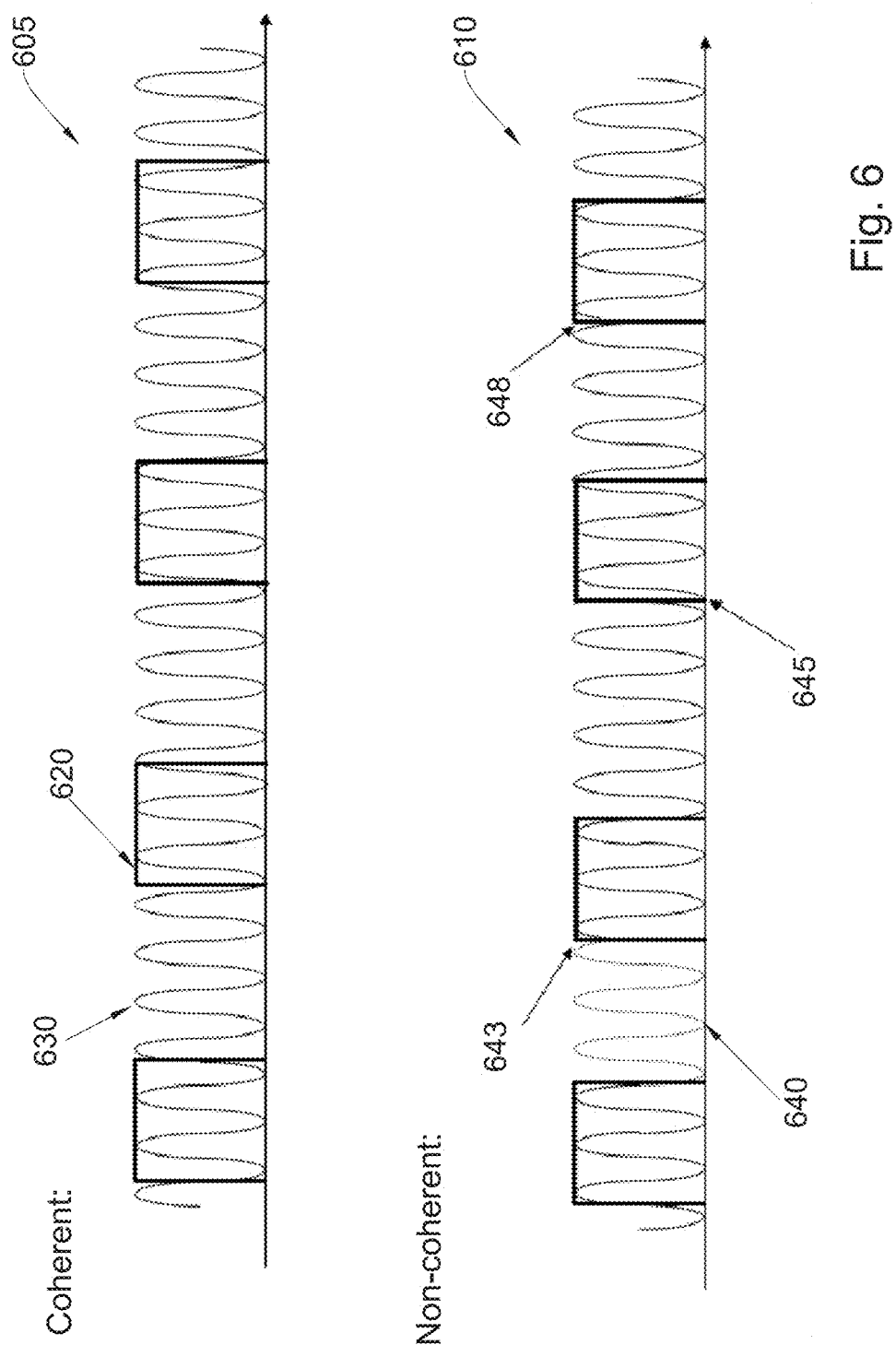

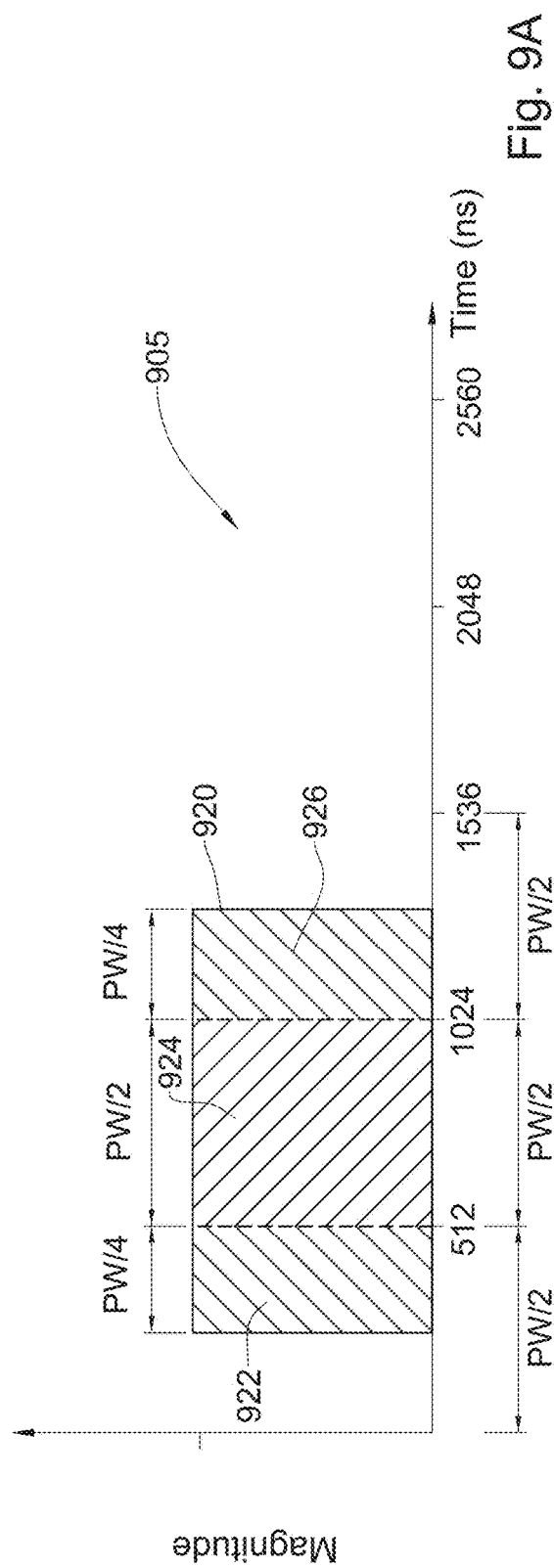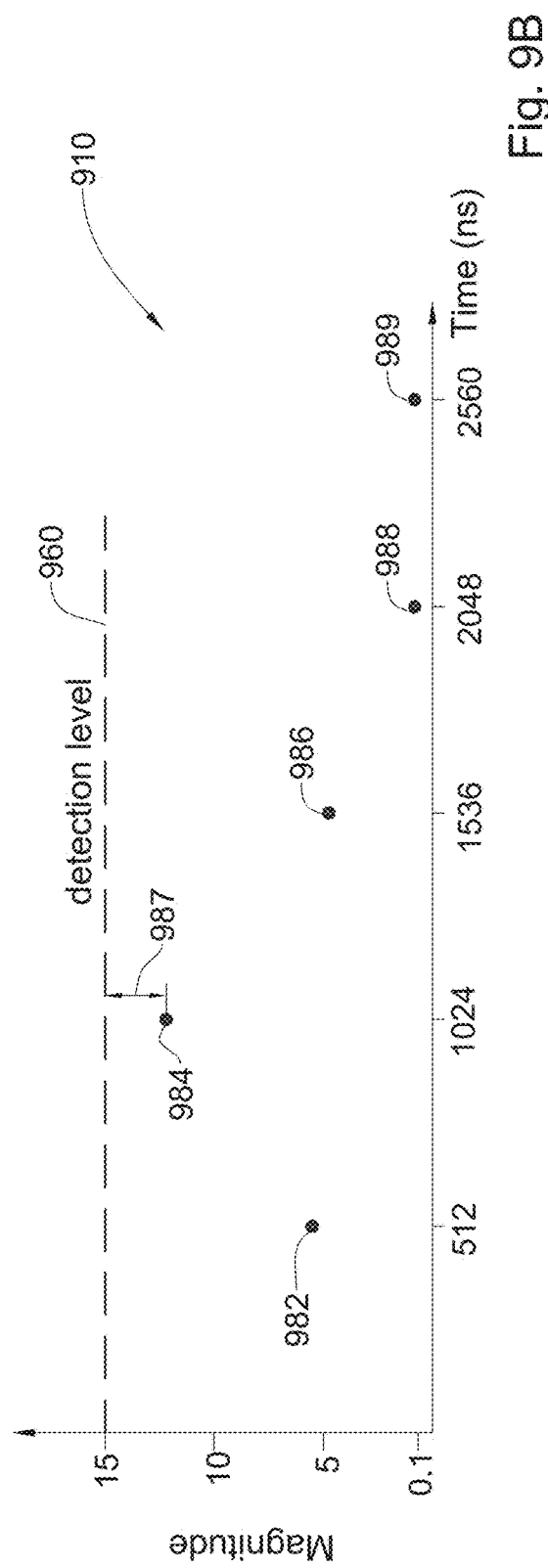

SIGNAL DETECTION BY MEANS OF SUPPLEMENTAL INFORMATION

TECHNOLOGICAL FIELD

The presently disclosed subject matter relates to systems and methods for signal detection.

BACKGROUND

System architectures for signal detection are known in the art. Emitters may emit electro-magnetic signals. Sensors may be capable of detecting emitted electro-magnetic signals, for example using known time- and/or spectral-based techniques. A plurality of sensors may be selected to work together as a group regarding a particular application. A system center may receive transmissions of data from one or more of the sensors, and may use this information to perform an application task. It may be the case that when an insufficient number of sensors in the group report in their transmission that they detected a particular signal during a particular time interval, the system center may have insufficient information available to be able to perform the application task.

SUMMARY OF THE INVENTION

In accordance with a first aspect of the presently disclosed subject matter, there is provided a method of communicating information from a sensor concerning a received signal, comprising:

(a) responsive to receiving by at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor, sending from the at least one detecting sensor an assistance information corresponding to the at least one emitted signal detected by the at least one detecting sensor during the defined time interval, to at least one non-detecting sensor, wherein the assistance information is capable of being utilized by the at least one non-detecting sensor to perform an action with respect to data indicative of an entire data of the frequency band received by the at least one non-detecting sensor during a corresponding defined time interval, the action corresponding to the at least one emitted signal received by the at least one non-detecting sensor during the corresponding defined time interval.

In accordance with a second aspect of the presently disclosed subject matter, there is further provided a method of performing an action associated with a received signal, comprising:

(a) receiving by at least one non-detecting sensor, an assistance information from at least one detecting sensor, wherein the assistance information was sent by the at least one detecting sensor, responsive to receiving by the at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor, wherein the assistance information corresponds to the at least one detected emitted signal to at least one non-detecting sensor during the defined time interval; and (b) performing the action with respect to data indicative of an entire data of the frequency band received by the at least one non-detecting sensor during a corresponding defined time interval, the action corresponding to the at least one emitted signal received by the at least one non-detecting sensor during the corresponding defined time interval.

In accordance with a third aspect of the presently disclosed subject matter, there is yet further provided a non-transitory program storage device readable by a computer tangibly embodying computer readable instructions executable by the computer to perform a method of communicating information from a sensor concerning a received signal; the method comprising:

(a) responsive to receiving by at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor, sending from the at least one detecting sensor an assistance information corresponding to the at least one emitted signal detected by the at least one detecting sensor during the defined time interval, to at least one non-detecting sensor, wherein the assistance information is capable of being utilized by the at least one non-detecting sensor to perform an action with respect to data indicative of an entire data of a frequency band received by the at least one non-detecting sensor during a corresponding defined time interval, the action corresponding to the at least one emitted signal received by the at least one non-detecting sensor during the corresponding defined time interval.

In accordance with a fourth aspect of the presently disclosed subject matter, there is yet further provided a non-transitory program storage device readable by a computer tangibly embodying computer readable instructions executable by the computer to perform a method of performing an action associated with a received signal; the method comprising:

(a) receiving by at least one non-detecting sensor, an assistance information from at least one detecting sensor, wherein the assistance information was sent by the at least one detecting sensor, responsive to receiving by the at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor, wherein the assistance information corresponds to the at least one detected emitted signal to at least one non-detecting sensor during the defined time interval; and (b) performing the action with respect to data indicative of an entire data of the frequency band received by the at least one non-detecting sensor during a corresponding defined time interval, the action corresponding to the at least one emitted signal received by the at least one non-detecting sensor during the corresponding defined time interval.

In accordance with a fifth aspect of the presently disclosed subject matter, there is yet further provided a system capable of communicating information concerning a received signal, comprising: a sensor, the sensor comprising a processing circuitry and configured to:

(a) responsive to receiving by at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor, send from the at least one detecting sensor assistance information corresponding to the at least one emitted signal detected by the at least one detecting sensor during the defined time interval, to at least one non-detecting sensor, wherein the assistance information is capable of being utilized by the at least one non-detecting sensor to perform an action with respect to data indicative of an entire data of a frequency band received by the at least one non-detecting sensor during a corresponding defined time interval, the action corresponding to the at least one emitted signal received by the at least one non-detecting sensor during the corresponding defined time interval.

In accordance with an embodiment of the presently disclosed subject matter, there is yet further provided a system, wherein the assistance information does not comprise the entire data of the frequency band received by the at least one detecting sensor during the defined time interval.

In accordance with an embodiment of the presently disclosed subject matter, there is yet further provided a system, wherein the assistance information comprises at least one instruction for saving of data received by the at least one non-detecting sensor during the corresponding defined time interval, indicative of the at least one emitted signal detected by the at least one detecting sensor during the defined time interval, and wherein performing the action comprises: saving of data, and sending at least a portion of the saved data to a system center when communication to the system center is available.

In accordance with an embodiment of the presently disclosed subject matter, there is yet further provided a system, wherein performing the action comprises extracting, from the data indicative of the entire data of a frequency band received by the at least one non-detecting sensor during the corresponding defined time interval, data indicative of the at least one emitted signal received by the at least one non-detecting sensor during the corresponding defined time interval.

In accordance with an embodiment of the presently disclosed subject matter, there is yet further provided a system, wherein the assistance information comprises data indicative of an entire received data sample at the at least one detecting sensor corresponding to the at least one emitted signal detected by the at least one detecting sensor.

In accordance with an embodiment of the presently disclosed subject matter, there is yet further provided a system, wherein the data indicative of the entire received data sample comprises data indicative of an entire received data sample at the at least one detecting sensor corresponding to at least one frequency of the at least one detected emitted signal.

In accordance with an embodiment of the presently disclosed subject matter, there is yet further provided a system, wherein the data indicative of the entire received data sample comprises data indicative of an entire received data sample at the at least one detecting sensor corresponding to sample times of the at least one detected emitted signal.

In accordance with an embodiment of the presently disclosed subject matter, there is yet further provided a system, wherein the assistance information is sent also to at least one other detecting sensor in a selected sensor group.

In accordance with an embodiment of the presently disclosed subject matter, there is yet further provided a system, wherein extracting data indicative of the at least one emitted signal comprises calculating difference data, based on the data indicative of the entire received data sample at the at least one detecting sensor corresponding to the at least one detected emitted signal, and on the data indicative of the entire data of the frequency band received by the at least one non-detecting sensor during the corresponding defined time interval, the difference data constituting data indicative of the at least one emitted signal received by the at least one non-detecting sensor during the corresponding defined time interval.

In accordance with an embodiment of the presently disclosed subject matter, there is yet further provided a system, the system further configured to:

prior to performing step (a) of the fifth aspect of the presently disclosed subject matter, perform the following:

(b) responsive to receiving by the at least one detecting sensor, during a defined time interval, data indicative of the entire data of the frequency band received by the at least one detecting sensor during the defined time interval, the entire data comprising the at least one signal emitted by the at least one emitter, and to detecting of the at least one emitted signal by the at least one detecting sensor, sending by the at least one detecting sensor, during the defined time interval, to at least one of other sensors in a selected sensor group, first information indicative of the at least one detected emitted signal, wherein the first information is indicative of the Signal to Noise Ratio (SNR) of the at least one detected emitted signal; and (c) responsive to receiving first information from the at least one of other sensors in the selected sensor group, indicative of detection of the at least one detected emitted signal by the at least one of other sensors, determining which assistance information, if any, should be sent to each one of at least one of other sensors in the selected sensor group.

In accordance with an embodiment of the presently disclosed subject matter, there is yet further provided a system, wherein step (c) of the fifth aspect of the presently disclosed subject matter further comprises: responsive to the detecting sensor receiving the at least one detected emitted signal at a highest Signal to Noise Ratio, determining that step (a) of the fifth aspect of the presently disclosed subject matter should be performed in respect of each sensor in the selected sensor group that did not send first information indicative of detection of the at least one detected emitted signal, each sensor constituting at least one non-detecting sensor.

In accordance with an embodiment of the presently disclosed subject matter, there is yet further provided a system, wherein the first information sent by at least one detecting sensor to at least one of other sensors comprises a pulse parameters set.

In accordance with an embodiment of the presently disclosed subject matter, there is yet further provided a system, wherein a required communication bandwidth for the assistance information is substantially smaller than a communication bandwidth required when sending the entire data of a frequency band received by the at least one detecting sensor during the defined time interval.

In accordance with an embodiment of the presently disclosed subject matter, there is yet further provided a system, wherein the required communication bandwidth for the assistance information is less than 10 percent of that required when sending the entire data of a frequency band received by the at least one detecting sensor during the defined time interval.

In accordance with an embodiment of the presently disclosed subject matter, there is yet further provided a system, wherein the at least one signal emitted by at least one emitter is a non-coherent signal.

In accordance with an embodiment of the presently disclosed subject matter, there is yet further provided a system, wherein the assistance information comprises at least one set of parameter values corresponding to the least one detected emitted signal, wherein the extracting data indicative of at the least one emitted signal comprises determining at least a Time of Arrival (TOA) value of the at least one emitted signal at the at least one non-detecting sensor, the at least the Time of Arrival of the at least one emitted signal constituting data indicative of at least one emitted signal received by the at least one non-detecting sensor during the corresponding defined time interval.

In accordance with an embodiment of the presently disclosed subject matter, there is yet further provided a system, wherein the at least one set of parameter values comprise at least: emitter frequency, a pulse width (PW), at least one Time of Arrival corresponding to the least one detected emitted signal, a Pulse Repetition Interval (PRI) and a number of pulses.

In accordance with an embodiment of the presently disclosed subject matter, there is yet further provided a system, wherein determining at least the Time of Arrival value comprises performing actions to filter out noise in the data indicative of an entire data of a frequency band received by the at least one non-detecting sensor, thereby detecting the emitted signal, wherein the actions to filter out noise comprise integrating a portion of the data indicative of an entire data of a frequency band that corresponds to at least one emitter frequency and wherein the portion of the data corresponds to time intervals corresponding to the at least one detected emitted signal.

In accordance with an embodiment of the presently disclosed subject matter, there is yet further provided a system, wherein the actions to filter out noise comprise:
  i) performing at least one first integration, of the data indicative of the entire data of a frequency band received by the at least one non-detecting sensor during the corresponding defined time interval, the first integration based on a first integration time interval and on the at least one emitter frequency, thereby creating first data points, wherein the first integration time interval corresponds to a defined percentage of the Pulse Width; and
  ii) determining whether the first data points comprise the data indicative of at least one emitted signal received by the at least one non-detecting sensor.

In accordance with an embodiment of the presently disclosed subject matter, there is yet further provided a system, the system further configured to:
  iii) in response to determining that the first data points do not comprise the data indicative of at least one emitted signal, perform a second integration, of data indicative of the first data points, based on a second integration time interval, and on the at least one emitter frequency, thereby creating second data points, wherein the second integration time interval corresponds to the Pulse Repetition Interval; and
  iv) determine that the second data points comprise the data indicative of at least one emitted signal received by the at least one non-detecting sensor.

In accordance with an embodiment of the presently disclosed subject matter, there is yet further provided a system, wherein the second integration is based on the number of pulses.

In accordance with an embodiment of the presently disclosed subject matter, there is yet further provided a system, wherein the second integration time interval is based on the Pulse Repetition Interval (PRI) and the number of pulses.

In accordance with an embodiment of the presently disclosed subject matter, there is yet further provided a system, wherein the second integration time interval is equal to the Pulse Repetition Interval (PRI) times (the number of pulses−1).

In accordance with an embodiment of the presently disclosed subject matter, there is yet further provided a system, wherein the second integration is one of a Fourier Transform, a Discrete Fourier Transform and a Fast Fourier Transform.

In accordance with an embodiment of the presently disclosed subject matter, there is yet further provided a system, wherein the first integration time interval is equal to PW/2.

In accordance with an embodiment of the presently disclosed subject matter, there is yet further provided a system, wherein the first integration is one of a Fourier Transform, a Discrete Fourier Transform, a Fast Fourier Transform and a Finite Impulse Response (FIR).

In accordance with an embodiment of the presently disclosed subject matter, there is yet further provided a system, wherein the data indicative of the entire data of a frequency band received by the at least one non-detecting sensor is multiplied by a window prior to step (i) of the fifth aspect of the presently disclosed subject matter.

In accordance with an embodiment of the presently disclosed subject matter, there is yet further provided a system, the system further configured to:
  (v) set the second integration time interval to be equal to Pulse Width,
  (vi) select, from the data indicative of the entire data of a frequency band received by the at least one non-detecting sensor, a portion of the data which corresponds to a time that is within a second time interval before at least one Time of Arrival of the at least one emitted signal at the at least one non-detecting sensor, and a third time interval after the at least one Time of Arrival, constituting data indicative of the entire data of a frequency band received by the at least one non-detecting sensor during the corresponding defined time interval;
  (vii) perform at least one modified first integration, of the portion of the data, the first integration based on a first integration time interval and on at least one emitter frequency, thereby creating modified first data points, wherein the first integration time interval corresponds to the Pulse Width, wherein first integrations are performed separately in respect of each of the data indicative of the entire data of a frequency band received by the at least one non-detecting sensor, wherein the modified first data points constitute first data points; and
  (viii) repeat steps (iii) and (iv) of the fifth aspect of the presently disclosed subject matter,
thereby determining a second Time of Arrival value of the at least one emitted signal.

In accordance with an embodiment of the presently disclosed subject matter, there is yet further provided a system, wherein the second Time of Arrival value is more accurate than the Time of Arrival value.

In accordance with an embodiment of the presently disclosed subject matter, there is yet further provided a system, wherein the size of the at least one parameter set for one emitter and for one dwell is less than 1000 bits.

In accordance with an embodiment of the presently disclosed subject matter, there is yet further provided a system, wherein the at least one signal emitted by at least one emitter is a coherent signal.

In accordance with an embodiment of the presently disclosed subject matter, there is yet further provided a system, wherein the extracting of the data indicative of the at least one emitted signal by the at least one non-detecting sensor can be performed without the at least one non-detecting sensor being required to buffer data samples until communication to the system center is available.

In accordance with an embodiment of the presently disclosed subject matter, there is yet further provided a system, wherein the data indicative of the entire data of a frequency band received by the at least one non-detecting sensor comprises the entire data of a frequency band received by the at least one non-detecting sensor.

In accordance with an embodiment of the presently disclosed subject matter, there is yet further provided a system, wherein the sending of the assistance information from the at least one detecting sensor comprises at least one of: sending directly from the detecting sensor to the non-detecting sensor, relaying via at least one other sensor, and relaying via at least one system center.

In accordance with an embodiment of the presently disclosed subject matter, there is yet further provided a system, wherein the at least one detecting sensor and at least one non-detecting sensor are comprised in at least one of an airborne vehicle, a balloon, a space-borne vehicle, a ground station, a ground vehicle, and a water-borne vehicle.

In accordance with an embodiment of the presently disclosed subject matter, there is yet further provided a system, wherein the at least one system center is comprised in at least one of airborne vehicle, a balloon, a space-borne vehicle, a ground station, a ground vehicle, and a water-borne vehicle.

In accordance with an embodiment of the presently disclosed subject matter, there is yet further provided a system, wherein the at least one emitter is one of: a radio transmitter equipment, a radar, and a communication system.

In accordance with an embodiment of the presently disclosed subject matter, there is yet further provided a system, wherein the defined time interval is a dwell.

In accordance with an embodiment of the presently disclosed subject matter, there is yet further provided a system, wherein the action with respect to data indicative of an entire data of the frequency band received by the at least one non-detecting sensor during a corresponding defined time interval may be utilized for calculating a location of the at least one emitter.

In accordance with an embodiment of the presently disclosed subject matter, there is yet further provided a system, wherein step (a) of the fifth aspect of the presently disclosed subject matter is further performed for at least a next defined time interval.

In accordance with a sixth aspect of the presently disclosed subject matter, there is yet further provided a system capable of performing an action associated with a received signal, comprising: a sensor, the sensor comprising a processing circuitry and configured to:
(a) receive by at least one non-detecting sensor, an assistance information from at least one detecting sensor, wherein the assistance information was sent by the at least one detecting sensor, responsive to receiving by the at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor,
wherein the assistance information corresponds to the at least one detected emitted signal to the at least one detecting sensor during the defined time interval; and
(b) perform the action with respect to data indicative of an entire data of the frequency band received by the at least one non-detecting sensor during a corresponding defined time interval, the action corresponding to the at least one emitted signal received by the at least one non-detecting sensor during the corresponding defined time interval.

In accordance with an embodiment of the presently disclosed subject matter, there is yet further provided a system, wherein the assistance information does not comprise the entire data of the frequency band received by the at least one detecting sensor during the defined time interval.

In accordance with an embodiment of the presently disclosed subject matter, there is yet further provided a system, wherein the assistance information comprises at least one instruction for saving of data received by the at least one non-detecting sensor during the corresponding defined time interval, indicative of the at least one emitted signal detected by the at least one detecting sensor during the defined time interval, and wherein performing the action comprises: saving of data, and sending at least a portion of the saved data to a system center when communication to the system center is available.

In accordance with an embodiment of the presently disclosed subject matter, there is yet further provided a system, wherein performing the action comprises extracting, from the data indicative of the entire data of a frequency band received by the at least one non-detecting sensor during the corresponding defined time interval, data indicative of the at least one emitted signal received by the at least one non-detecting sensor during the corresponding defined time interval.

In accordance with an embodiment of the presently disclosed subject matter, there is yet further provided a system, wherein the assistance information comprises data indicative of an entire received data sample at the at least one detecting sensor corresponding to the at least one emitted signal detected by the at least one detecting sensor.

In accordance with an embodiment of the presently disclosed subject matter, there is yet further provided a system, wherein the data indicative of the entire received data sample comprises data indicative of an entire received data sample at the at least one detecting sensor corresponding to at least one frequency of the at least one detected emitted signal.

In accordance with an embodiment of the presently disclosed subject matter, there is yet further provided a system, wherein the data indicative of the entire received data sample comprises data indicative of an entire received data sample at the at least one detecting sensor corresponding to sample times of the at least one detected emitted signal.

In accordance with an embodiment of the presently disclosed subject matter, there is yet further provided a system, wherein the assistance information is sent also to at least one other detecting sensor in a selected sensor group.

In accordance with an embodiment of the presently disclosed subject matter, there is yet further provided a system, wherein extracting data indicative of the at least one emitted signal comprises calculating difference data, based on the data indicative of the entire received data sample at the at least one detecting sensor corresponding to the at least one detected emitted signal, and on the data indicative of the entire data of the frequency band received by the at least one non-detecting sensor during the corresponding defined time interval, the difference data constituting data indicative of the at least one emitted signal received by the at least one non-detecting sensor during the corresponding defined time interval.

In accordance with an embodiment of the presently disclosed subject matter, there is yet further provided a system, wherein the first information sent by at least one detecting sensor to at least one of other sensors comprises a pulse parameters set.

In accordance with an embodiment of the presently disclosed subject matter, there is yet further provided a system, wherein a required communication bandwidth for the assistance information is substantially smaller than a communication bandwidth required when sending the entire data of a frequency band received by the at least one detecting sensor during the defined time interval.

In accordance with an embodiment of the presently disclosed subject matter, there is yet further provided a system, wherein the required communication bandwidth for the assistance information is less than 10 percent of that required when sending the entire data of a frequency band received by the at least one detecting sensor during the defined time interval.

In accordance with an embodiment of the presently disclosed subject matter, there is yet further provided a system, wherein the at least one signal emitted by at least one emitter is a non-coherent signal.

In accordance with an embodiment of the presently disclosed subject matter, there is yet further provided a system, wherein the assistance information comprises at least one set of parameter values corresponding to the least one detected emitted signal, wherein the extracting data indicative of the at least one emitted signal comprises determining at least a Time of Arrival (TOA) value of the at least one emitted signal at the at least one non-detecting sensor, the at least the Time of Arrival of the at least one emitted signal constituting data indicative of at least one emitted signal received by the at least one non-detecting sensor during the corresponding defined time interval.

In accordance with an embodiment of the presently disclosed subject matter, there is yet further provided a system, wherein the at least one set of parameter values comprises at least: emitter frequency, a pulse width (PW), at least one Time of Arrival corresponding to the least one detected emitted signal, a Pulse Repetition Interval (PRI) and a number of pulses.

In accordance with an embodiment of the presently disclosed subject matter, there is yet further provided a system, wherein determining at least the Time of Arrival value comprises performing actions to filter out noise in the data indicative of an entire data of a frequency band received by the at least one non-detecting sensor, thereby detecting the emitted signal, wherein the actions to filter out noise comprise integrating a portion of the data indicative of an entire data of a frequency band that corresponds to at least one emitter frequency and wherein the portion of the data corresponds to time intervals corresponding to the at least one detected emitted signal.

In accordance with an embodiment of the presently disclosed subject matter, there is yet further provided a system, wherein the actions to filter out noise comprise:
   i) performing at least one first integration, of the data indicative of the entire data of a frequency band received by the at least one non-detecting sensor during the corresponding defined time interval, the first integration based on a first integration time interval and on the at least one emitter frequency, thereby creating first data points, wherein the first integration time interval corresponds to a defined percentage of the Pulse Width; and
   ii) determining whether the first data points comprise the data indicative of at least one emitted signal received by the at least one non-detecting sensor.

In accordance with an embodiment of the presently disclosed subject matter, there is yet further provided a system, the system further configured to:
   iii) in response to determining that the first data points do not comprise the data indicative of at least one emitted signal, perform a second integration, of data indicative of the first data points, based on a second integration time interval, and on the at least one emitter frequency, thereby creating second data points, wherein the second integration time interval corresponds to the Pulse Repetition Interval; and
   iv) determine that the second data points comprise the data indicative of at least one emitted signal received by the at least one non-detecting sensor.

In accordance with an embodiment of the presently disclosed subject matter, there is yet further provided a system, wherein the second integration is based on the number of pulses.

In accordance with an embodiment of the presently disclosed subject matter, there is yet further provided a system, wherein the second integration time interval is based on the Pulse Repetition Interval (PRI) and the number of pulses.

In accordance with an embodiment of the presently disclosed subject matter, there is yet further provided a system, wherein the second integration time interval is equal to the Pulse Repetition Interval (PRI) times (the number of pulses−1).

In accordance with an embodiment of the presently disclosed subject matter, there is yet further provided a system, wherein the second integration is one of a Fourier Transform, a Discrete Fourier Transform and a Fast Fourier Transform.

In accordance with an embodiment of the presently disclosed subject matter, there is yet further provided a system, wherein the first integration time interval is equal to PW/2.

In accordance with an embodiment of the presently disclosed subject matter, there is yet further provided a system, wherein the first integration is one of a Fourier Transform, a Discrete Fourier Transform, a Fast Fourier Transform and a Finite Impulse Response (FIR).

In accordance with an embodiment of the presently disclosed subject matter, there is yet further provided a system, wherein the data indicative of the entire data of a frequency band received by the at least one non-detecting sensor is multiplied by a window prior to step (i) of the sixth aspect of the presently disclosed subject matter.

In accordance with an embodiment of the presently disclosed subject matter, there is yet further provided a system, the system further configured to:
   (v) set the second integration time interval to be equal to Pulse Width, (vi) select, from the data indicative of the entire data of a frequency band received by the at least one non-detecting sensor, a portion of the data which corresponds to a time that is within a second time interval before at least one Time of Arrival of the at least one emitted signal at the at least one non-detecting sensor, and a third time interval after the at least one Time of Arrival, constituting data indicative of the entire data of a frequency band received by the at least one non-detecting sensor during the corresponding defined time interval;

(vii) perform at least one modified first integration, of the portion of the data, the first integration based on a first integration time interval and on at least one emitter frequency, thereby creating modified first data points, wherein the first integration time interval corresponds to the Pulse Width, wherein first integrations are performed separately in respect of each of the data indicative of the entire data of a frequency band received by the at least one non-detecting sensor, wherein the modified first data points constitute first data points; and (viii) repeat steps (iii) and (iv) of the sixth aspect of the presently disclosed subject matter, thereby determining a second Time of Arrival value of the at least one emitted signal.

In accordance with an embodiment of the presently disclosed subject matter, there is yet further provided a system, wherein the second Time of Arrival value is more accurate than the Time of Arrival value.

In accordance with an embodiment of the presently disclosed subject matter, there is yet further provided a system, wherein the size of the at least one parameter set for one emitter and for one dwell is less than 1000 bits.

In accordance with an embodiment of the presently disclosed subject matter, there is yet further provided a system, wherein the at least one signal emitted by at least one emitter is a coherent signal.

In accordance with an embodiment of the presently disclosed subject matter, there is yet further provided a system, wherein the extracting of the data indicative of the at least one emitted signal by the at least one non-detecting sensor can be performed without the at least one non-detecting sensor being required to buffer data samples until communication to the system center is available.

In accordance with an embodiment of the presently disclosed subject matter, there is yet further provided a system, wherein the data indicative of the entire data of a frequency band received by the at least one non-detecting sensor comprises the entire data of a frequency band received by the at least one non-detecting sensor.

In accordance with an embodiment of the presently disclosed subject matter, there is yet further provided a system, wherein the sending of the assistance information from the at least one detecting sensor comprises at least one of: sending directly from the detecting sensor to the non-detecting sensor, relaying via at least one other sensor, relaying via at least one system center.

In accordance with an embodiment of the presently disclosed subject matter, there is yet further provided a system, wherein the at least one detecting sensor and at least one non-detecting sensor are comprised in at least one of an airborne vehicle, a balloon, a space-borne vehicle, a ground station, a ground vehicle, and a water-borne vehicle.

In accordance with an embodiment of the presently disclosed subject matter, there is yet further provided a system, wherein the at least one system center is comprised in at least one of airborne vehicle, a balloon, a space-borne vehicle, a ground station, a ground vehicle, and a water-borne vehicle.

In accordance with an embodiment of the presently disclosed subject matter, there is yet further provided a system, wherein the at least one emitter is one of: a radio transmitter equipment, a radar, and a communication system.

In accordance with an embodiment of the presently disclosed subject matter, there is yet further provided a system, wherein the defined time interval is a dwell.

In accordance with an embodiment of the presently disclosed subject matter, there is yet further provided a system, wherein the action with respect to data indicative of an entire data of the frequency band received by the at least one non-detecting sensor during a corresponding defined time interval may be utilized for calculating a location of the at least one emitter.

In accordance with an embodiment of the presently disclosed subject matter, there is yet further provided a system, wherein step (a) of the sixth aspect of the presently disclosed subject matter is further performed for at least a next defined time interval.

In accordance with an aspect of the presently disclosed subject matter, there is yet further provided a system capable of performing an action associated with a received signal, comprising: a sensor, the sensor comprising a processing circuitry and configured to:

(a) responsive to receiving by at least one detecting sensor, during a defined time interval, data indicative of an entire responsive to receiving by at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor, sending from the at least one detecting sensor assistance information corresponding to the at least one emitted signal detected by the at least one detecting sensor during the defined time interval, to at least one system center, wherein the assistance information is capable of being utilized by the at least one system center to send second assistance information to at least one non-detecting sensor, wherein the second assistance information is capable of being utilized by the at least one non-detecting sensor to perform an action with respect to data indicative of an entire data of the frequency band received by the at least one non-detecting sensor during a corresponding defined time interval, the action corresponding to the at least one emitted signal received by the at least one non-detecting sensor during the corresponding defined time interval.

BRIEF DESCRIPTION OF THE DRAWINGS

In order to understand the presently disclosed subject matter and to see how it can be carried out in practice, examples will now be described, by way of non-limiting example only, with reference to the accompanying drawings, in which:

FIGS. 2A to 2F illustrate generalized examples of electromagnetic transmissions received at a sensor, in accordance with certain embodiments of the presently disclosed subject matter.

FIG. 6 illustrates generalized example representations of types of signals, in accordance with certain embodiments of the presently disclosed subject matter.

FIG. 9A illustrates a generalized example of a signal in the time domain, in accordance with certain embodiments of the presently disclosed subject matter.

FIG. 9B illustrates a generalized example of arranging filtered data points, in accordance with certain embodiments of the presently disclosed subject matter.

DETAILED DESCRIPTION OF THE DRAWINGS

Figure 1:
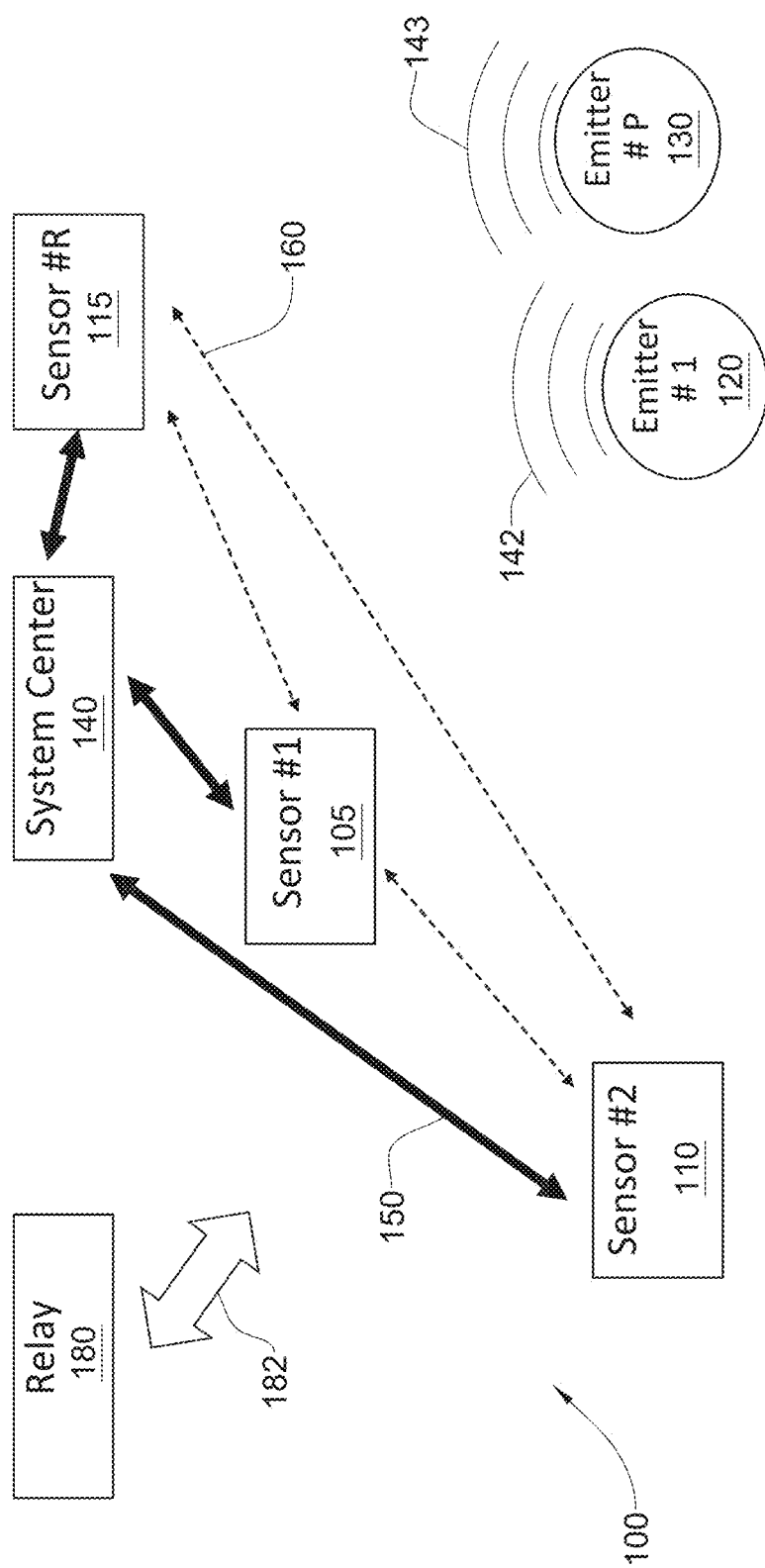
FIG. 1 illustrates a generalized example system architecture for signal detection, in accordance with certain embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, circuits and protocols have not been described in detail so as not to obscure the presently disclosed subject matter.

Unless specifically stated otherwise, as apparent from the following discussions, it is appreciated that throughout the specification discussions utilizing terms such as "maneuvering", "steering", "detecting", "determining", "deciding", "instructing", "calculating", "providing", "performing", "working", "receiving", "communicating", "sending", "routing", "identifying", "measuring", "processing", "transmitting", "reporting", "executing", "scanning", "synchronizing", "sampling", "controlling", "monitoring", "analyzing", "correlating", "writing", or the like, include action(s) and/or processes of a computer that manipulate and/or transform data into other data, said data represented as physical quantities, e.g. such as electronic or mechanical quantities, and/or said data representing the physical objects. The term "computer" should be expansively construed to cover any kind of hardware-based electronic device with data processing capabilities, including, by way of non-limiting example, a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), any other electronic computing device, including, by way of non-limiting example, the processing circuitry therein, such as for example the processing circuitry 350 (further detailed herein with regard to FIG. 3A), disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples" or variants thereof means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof should be construed as conveying that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that that the teachings of the presently disclosed subject matter are not bound by what is described with reference to any of the figures or described in other documents referenced in this application.

It should also be noted that, in the presently disclosed subject matter, phrases such as "data indicative of the detected signal", "data indicative of the entire data of a frequency band received", and the like, are used in some cases. This usage is done, among other purposes, to clarify that, in some cases, receiving, processing, storing or saving, sending etc. may not be performed on all of a particular set of data, but rather only a portion of the data.

Bearing this in mind, attention is now drawn to FIG. 1, illustrating an example system architecture 100 for signal detection, in accordance with certain embodiments of the presently disclosed subject matter. There are shown P emitters 120, 130, where P can be one or more. These emit electro-magnetic signals 142, 143, for example in the RF frequency range. Non-limiting examples of such emitters may be radio transmitter equipment, or radar or communication systems. These emitters may be located on, or associated with, platforms such airborne vehicles, balloons, space-borne vehicles, ground station, ground vehicles, and water-borne vehicles, these being non-limiting examples. One example of an airborne vehicle is an aircraft. Some examples of an space-borne vehicle are a satellite or a spacecraft. Another example of an space-borne vehicle is a satellite. One example of a ground vehicle is a truck. One example of a water-borne vehicle is a ship. Each emitter 120, 130 may in some cases emit electro-magnetic signals 142, 143 at a frequency different than that of other emitters, during a given time frame.

There are further shown R sensors 105, 110, 115. R is at least two. In some cases, R may be 3 or 4. These sensors are capable of detecting emitted electro-magnetic signals 142, 143, for example using known time- and/or spectral-based techniques. These sensors may be located on, or associated with, platforms such as airborne vehicles, balloons, space-borne vehicles, ground systems, ground vehicles, and water-borne vehicles, these being non-limiting examples. A plurality of sensors may be selected to work together regarding the particular application, and may be configured to be aware of each other, and to be able to communicate with each other, for example in order to jointly provide information for use in a particular application. Such sensors may be referred to as a selected sensor group. The utilization of multiple sensors that are capable of detecting emitted signals may be useful in various applications. In the currently disclosed subject matter, geo-location will be described, as one non-limiting example application. Note that in some examples, a particular sensor 105 may belong to one or more different selected sensor groups, depending on the configuration of the system—which in turn may be a function of the particular application. Note also, that in some examples, more than one of the sensors is located on the same platform/vehicle, for example pointed in different directions. Note also that, in some examples, one sensor on a particular platform detects the signal, while another sensor on that same platform does not detect the signal (for example, because they do not point in the same direction).

There is further shown a system 140, referred to herein as a system center. This may, for example, receive transmissions of data 150 from one or more of the sensors 105, 110, 115. It may use this information to perform an application task. In the non-limiting example application elaborated herein, of geo-location, system center 140 may use the data transmissions 150 received from some or all of the sensors to calculate the geographic location of one or more of the emitters 120, 130. This may be done, for example, using known geo-location techniques, involving differential parameters such as Time of Arrival (TOA), Doppler or phase, using known techniques. In this example, system center 140 may be referred to as a geo-locating system center. Sensors 105, 110, 115 and system center 140 may comprise a radio-based geo-locating system.

In some example embodiments, system center 140 may be a ground station. In other embodiments, it may be located on, or associated with, platforms such as airborne vehicles, balloons, space-borne vehicles, ground systems, ground vehicles, and water-borne vehicles. Although in the example of FIG. 1 one system center 140 is shown, in other cases there may be multiple system centers 140. In some cases, the multiple system centers 140 may communicate with each other, and work collaboratively, for example to calculate the location of the emitters 120, 130.

The above discussion exemplifies a case where the sensors send information to the system center 140, which is not a sensor, which performs an application task. In other example cases, however, the sensors could send the information to one (or more) of the sensors, which have sufficient processing power to calculate and perform the particular application task. In that sense, the particular sensor(s) may function as a system center as well. In other examples, the system center may be associated with processing circuitry separate from that of a sensor, but maybe physically co-located with the sensor. In one example, both systems may be located in the same truck.

FIG. 1 also shows inter-sensor communication 160. In some cases, this communication will be of a narrower bandwidth, that is of a lower data rate, as compared to the bandwidth and data rate of data transmissions 150 between sensors and system center 140. A use of such narrow-bandwidth inter-sensor communication 160 for the purpose of assisting in signal detection is described herein.

It should be noted here, that when reference is made to sending of information from one component to another, e.g. from one sensor to another sensor, or from one sensor to the system center 140 or vice versa, the subject matter contemplates various methods for routing such information. In some examples, the sending may be directly from one component to another (e.g. 105 to 110). In other examples, the data may be broadcast, such that numerous other components may receive it. In still other examples, the source component may send to the destination component via a third component functioning as a relay for the transmission. This may be done based on configuration of components, in order to handle cases such as lack of Line of Sight (LOS) between the source component and the destination component, at a time when both source and destination have LOS to the third component. For example, a detecting sensor 105 may send information to a non-detecting sensor 110 via the system center 140. Another example may be a sensor 105 sending information to the system center 140 via another sensor 115. Similarly, the system architecture 100 may additionally include one or more relays 180. These may be any type of component that functions neither as a sensor nor as a system center, but is configured to, and capable of, communicating with one or more sensors and/or one or more system centers so as to relay data between any or all of them as needed. This communication is shown in a generalized schematic fashion as 182. One non-limiting example of such a relay 180 may be a geo-stationary satellite with LOS to at least two of the other components. It is also envisioned, that a communication between components may in some cases be relayed via more than one relay 180 in order to reach its destination.

Figure 2A:
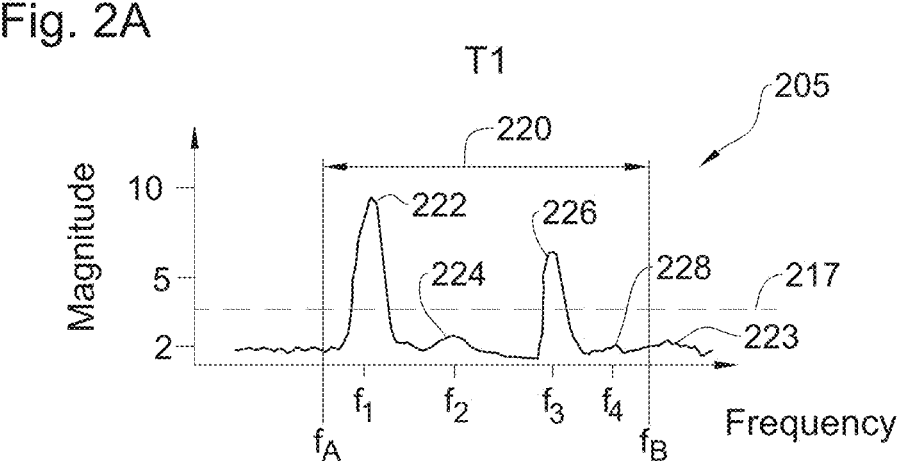

Turning now to FIG. 2A, it illustrates one example of electro-magnetic transmissions received at a sensor, in accordance with certain embodiments of the presently disclosed subject matter. FIG. 2A shows an example representation, in the frequency domain, of received electro-magnetic transmissions during a time interval T1, such as e.g. a processing frame of a signal processor 335 (described further herein with regard to FIG. 3). Note that in some cases a processing frame may be considerably smaller than a dwell. In the example shown in FIGS. 1 and 2, the transmissions were received by Sensor 1, 105. FIG. 2A shows a graph 205, plotting the magnitude of data 223 received at time T1, indicative of the entire electro-magnetic transmission, as a function of frequency. This magnitude may be referred to interchangeably herein also as power level or intensity. Electro-magnetic transmissions may be of various frequencies. Frequency range 220 may be referred to as a frequency band 220, analyzed by sensor 105 so at to detect and estimate parameters of signals that were emitted in that range by one or more emitters. Sensor 105 may receive and process all, or some, of the entire data of such a frequency band 220. Note also that sensor 105 may be capable of, and configured for, scanning more than one frequency band 220, scanning a frequency band during each dwell.

It can be seen in the figure that transmissions at different frequencies may be received at different power levels or magnitudes. For example, it can be seen that the received transmission 222 at and around frequency $f_1$ is of a higher magnitude than the received transmission 226 at and around frequency $f_3$. The received transmissions 224 and 228, for frequency $f_2$ and $f_4$, are at lower magnitudes than both 222 and 226 the others, and are at levels near or below the detection level 217 for this sensor, that is their signal-to-noise ratio (SNR) is comparatively low. It may thus be said that received transmissions 222 and 226 contain signals emitted by emitters 120, 130, that are capable of being detected by sensor 105, as they are sufficiently above the detection level 217 to be detected and identified; that is, their signal-to-noise ratio (SNR) is comparatively high. It may also be said that received transmissions 224 and 228 are not sufficiently above the detection level 217 to be detected and identified, and thus that sensor 105 did not detect emitted signals in the time T1 corresponding to frequency $f_2$ and $f_4$. Note that one example reason for a detection level, below which a signal may not be detected, may be noise.

It may be thus understood, that not every sensor in a selected sensor group will always detect all emitted signals that other sensors in the sensor group detect. For example, in FIG. 1 it may be that sensors 105 and 115 may detect the particular signal emitted by emitter 130 at a certain point in time, while sensor 110 does not detect the same emitted signal corresponding to the same point in time.

One example reason may be that sensor 110 is positioned in a direction relative to the emitter 130, such that it receives transmissions from side or back lobes rather than from the main lobe. See for example the arrangement in FIG. 1.

Another example reason may be the greater distance of sensor 110 from emitter 130, which may cause the signal from emitter 130 received at sensor 110 to be weaker than that received at e.g. sensors 105. In such cases, the signal from emitter 130 received at sensor 110 may be possibly sufficiently weak that the Signal to Noise Ratio (SNR) does not enable the emitted signal to be detected relative to the noise received corresponding to the same frequency.

Note that that the depiction with regard to FIG. 2 is only one non-limiting example. The figure presents a case where each transmission, and each signal emitted from a particular emitter, being received at all of the sensors in the same time. In some examples, this may be the case. In other examples, there may be lags in the time that a particular signal reaches two different sensors. Such a delay may be caused, for example, by the different distances of each sensor from the emitter. Sensors in a selected sensor group may in some cases be synchronized with each other. In some examples, two sensors may know the relative delay between them in receiving the same signal. In some example cases, this lag is not known a priori, but may be determined during the process of extracting signals. (One non-limiting example of this latter case may be seen with respect to the example Time of Arrival calculations presented with regard to FIG. 7A.) Therefore, in some cases, if a detecting sensor receives a signal during a defined time interval, the non-detecting sensor may perform an action with respect to data received in a different time interval, a related time interval that has a correspondence to the defined time interval, but that is delay-adjusted or offset from the defined time interval by the amount of the lag. Such a related defined time interval may be referred to herein as a corresponding defined time interval. As already indicated, in some cases the corresponding defined time interval may be equal to the defined time interval during which the detecting sensor receives the signal.

It should also be noted, that FIG. 2 show only a non-limiting example of a single detection level 217 for all the sensors. In some example cases, the detection level may vary per sensor, based on for example noise considerations. Thus, detection and non-detection of a particular signal by a particular sensor may be a function of the detection level of that sensor. For example, consider a case where two sensors both receive a signal at an magnitude of 10. The first sensor has a detection level of 2, while the second sensor has a detection level of 11. In such a case, the first sensor may detect, while the second does not detect—despite the fact that each received the signal at the same magnitude.

Note that in some cases, the frequencies $f_1$, $f_2$, $f_3$ and $f_4$ may be frequency bins. Frequency bins are discussed further herein.

Further elaboration of FIGS. 2A-2F is presented further herein.

In some example implementations known in the art, sensors may transmit data 150 to system center 140 using the following mechanism. Sensors that detect a signal may send data corresponding to each detected signal and descriptive of the detected signal. In some implementations, this data may be a set of parameters. One example of such a set of parameters is a Pulse Parameters Set. The Pulse Parameters Set may contain at least the following fields: time of arrival, signal frequency, magnitude or strength of the detected signal, or possibly SNR (Signal to Noise Ratio), and pulse width. In the example of FIG. 2A, for one of the detected signals, the pulse parameters set may correspond to T1, frequency $f_1$ and magnitude of 222, which is represented by the example value "10". System center 140 receives the transmissions 150 from sensors of the selected sensor group that detected signals. Sensors that did not detect a signal during T1 may send no data corresponding to that signal. If a sufficient number of sensors in the group report, in their transmission, that they detected a particular signal during a particular time interval, e.g. a signal of frequency $f_1$ during T1, the system center 140 may be able to make use of this information to perform an application task. For example, for the application of geo-location, the system center may be able to use known methods to determine the location of the emitter (e.g. 120) that emitted that signal during that time interval. If, on the other hand, an insufficient number of sensors in the group report in their transmission that they detected a particular signal during a particular time interval, system center 140 may have insufficient information to be able to perform an application task. For example, the system center may be unable to geo-locate that emitter during that time interval. The location attempt for that time interval may thus be unsuccessful.

Turning to FIG. 3, there is now provided a description of certain examples of systems for signal detection.

Figure 3A:
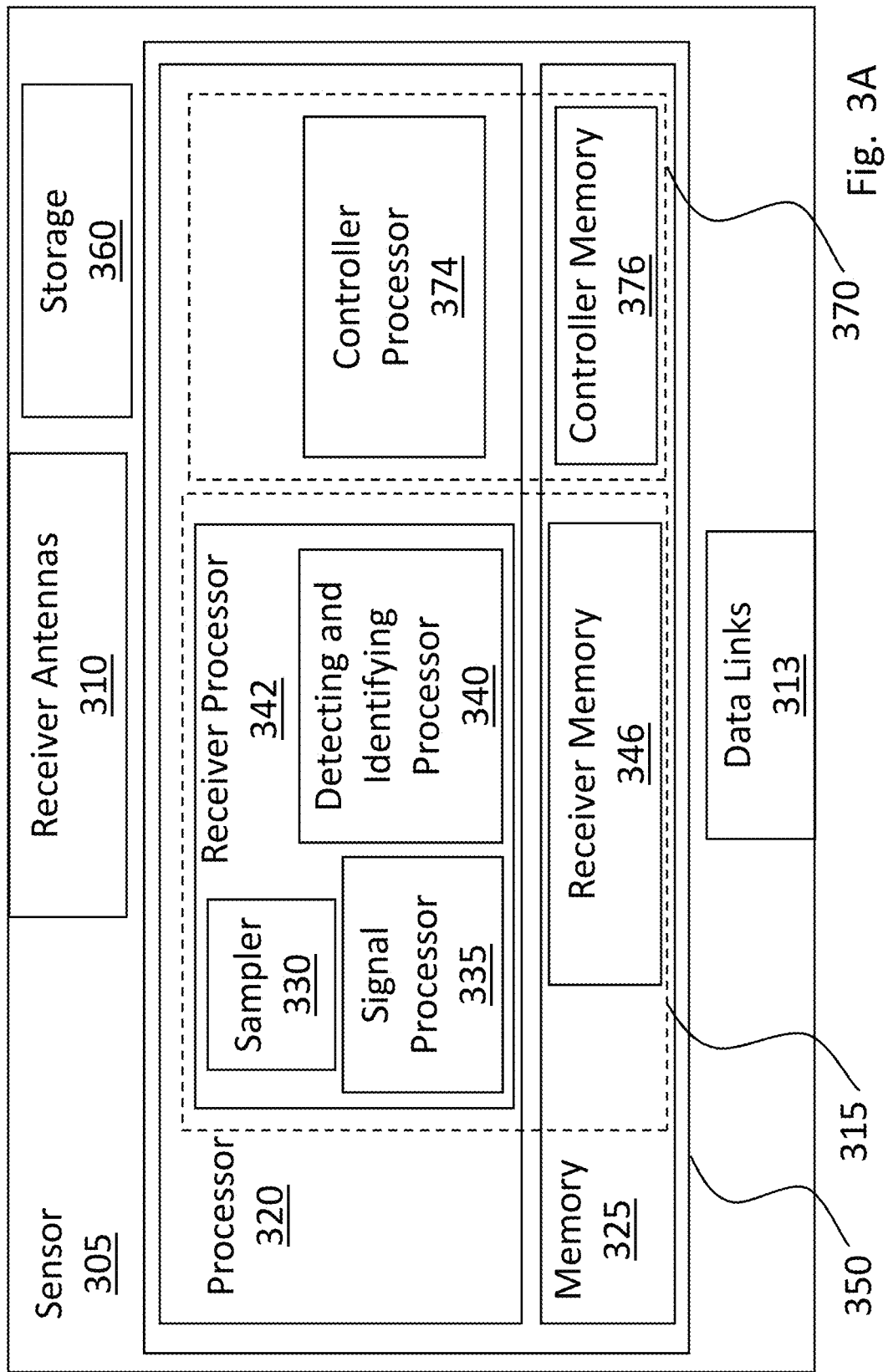
FIGS. 3A to 3B are block diagrams schematically illustrating a generalized example sensor in accordance with certain exemplary embodiments of the presently disclosed subject matter.

Reference is now made to FIG. 3A, which is a block diagram schematically illustrating an example sensor, in accordance with certain embodiments of the presently disclosed subject matter. In some examples, sensor 305 may include at least one receiver 315, in addition to other components.

The receiver 315 may in some examples include a computer. It may, by way of non-limiting example, comprise processing circuitry 350. Processing circuitry 350 may comprise a processor 320 and memory 325.

The processor 320 is shown, in the particular example of FIG. 3A, as comprising two component processors: receiver processor 342 and controller processor 374. Receiver processor 342 in turn is shown as comprising three component processors: sampler 330, signal processor 335, detecting and identifying processor 340. Examples of the functions of these various component processors will be further elaborated with regard to FIG. 3B.

The processing circuitry 350 may also include, in some examples, one or more memories 325. According to some examples of the presently disclosed subject matter, the memory 325 can be configured to hold configuration data of the sensor (e.g. what sensors are part of each selected sensor group), emitter data (used e.g. for identifying detected emitters). Memory 325 can also be used, for example, to hold at least some data associated with calculations and determining described herein for detecting signals. These are non-limiting examples of data items that may make use of memory 325. The memory 325 is shown, in the particular example of FIG. 3A, as comprising two component memories: receiver memory 346 and controller memory 376.

Considering the processors and memories from a functionality point of view, receiver processor 342 and receiver memory 346 may in some examples be viewed as comprising a receiver functionality 315. 315 is shown in broken lines, to indicate that it is a functionality. Receiver memory 346 may provide the memory used by receiver processor 342 and, in some examples, by the three component processors 330, 335, 340. These components may work together, functionally, to receive and process signals from the receiver antennas, as will be further elaborated with regard to FIG. 3B and elsewhere herein.

Similarly, considering the processors and memories from a functionality point of view, controller processor 374 and controller memory 376 may in some examples be viewed as comprising a controller functionality 370. 370 is shown in broken lines, to indicate that it is a functionality. Controller memory 346 may provide the memory used by controller processor 342. Examples of functions that may be viewed, in some cases, as those of a controller functionality 370 will be further elaborated with regard to FIG. 3B and elsewhere herein.

There may be, in some cases, multiple instances of the controller functionality 370. In example cases, some instances of the controller functionality may include a processor and a memory, and some may be based purely on electrical circuits with electrical inputs, without a memory.

The processing circuitry 350 may be, in non-limiting examples, general-purpose computers specially configured for the desired purpose by a computer program stored in a non-transitory computer-readable storage medium. They may be configured to execute several functional modules in accordance with computer-readable instructions. In other non-limiting examples, processing circuitry 350 may be computers specially constructed for the desired purposes.

The sensor 305 may also include, in some examples, receiver antennas 310. These may be operatively coupled or connected to the receiver 315. Examples of receiver antennas functions will be further elaborated with regard to FIG. 3B.

The sensor 305 may also include, in some examples, data links 313. These may be operatively coupled or connected to the receiver 315. These may include system center data link 317 and sensor data link 319. Examples of data link functions will be further elaborated with regard to FIG. 3B.

The sensor 305 may also include, in some examples, storage 360. Storage 360 may include, as non-limiting examples, the recorders 363 and 365 which are described with regard to FIG. 3B. Depending on system design, more or less of the data storage may occur in memory 325 or in storage 360.

Figure 3B:
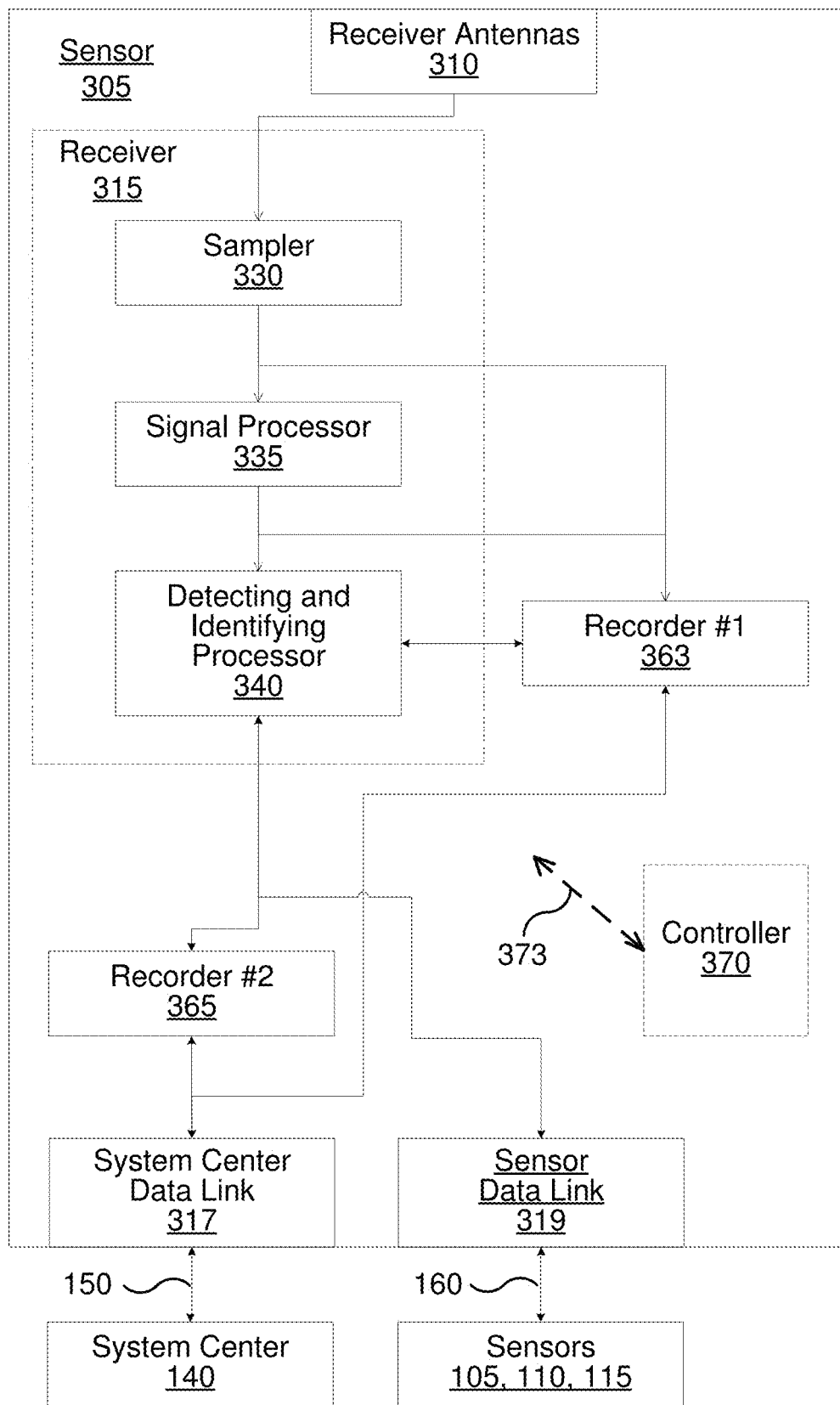

Reference is now made to FIG. 3B, which is a block diagram schematically illustrating an example sensor, in accordance with certain examples of the presently disclosed subject matter. For purposes of clarity of exposition, the information exemplified in FIGS. 3A and 3B has been separated into two figures. FIG. 3A describes, at a high level, example components of the system. FIG. 3B describes possible example interactions between certain of those example components and/or certain of their sub-components. Thus, in the example shown in FIG. 3B, processing circuitry 350, processor 320 and its components 342 and 374, and memory 325 and its components 346 and 376, are not shown. Similarly, the sub-components of controller functionality 370 are not shown. Similarly, recorders 363 and 365 are shown, but not storage 360. Similarly, system center data link 317 and sensor data link 319 are shown, but not data links 313. This is all done for clarity of exposition.

Receiver antennas 310 of sensor 305 may receive electromagnetic transmissions, which may include both signals from emitters as well as noise. It may scan the frequencies in a synchronized fashion. All sensors in a selected sensor group may be synchronized, such that all scan the same frequency band 220 during the same dwell N. The functionality of controller 370 may include controlling the process, e.g. instructing receiver antennas which band to scan in a particular dwell. The band to be scanned may also change during the process, for example based on updates received by processor 374 of the controller 370 from the system center 140. In some cases, instead of scanning sequentially through the frequencies, the entire frequency band can be received at once.

Sampler 330 may be operatively coupled or connected to Receiver antennas 310. Sampler may receive data associated with the scanned frequency band 220 that was received during a particular dwell number. The sampler may perform analog to digital conversion on certain frequency bands per dwell. This sampling may be performed at a sampling rate $f_s$. The output of this may be samples. In example cases, these samples may comprise amplitude and phase information for each sampling time.

Signal Processor 335 may be operatively coupled or connected to Sampler 330. Signal processor 335 may process those received samples, by for example performing digital filtering on them, thus deriving processed samples in the frequency domain. It may use, for example, FFT (Fast Fourier Transform) or some other filtering technique. This may yield frequency bins, also referred to herein interchangeably as bins, each with amplitude and phase information.

Detecting and Identifying Processor 340 may be operatively coupled or connected to Signal Processor 335. It may determine in what bins it detects signals. It may, in some example cases, analyze individual pulses and determine which represent a particular signal. In some example cases, it may cross-correlate data in its own bin with data that it received from other sensors. In some cases, it may perform parameter estimation, for example determining Pulse Parameter Set values. In some cases, it may calculate difference data, involving differential parameters such as TOA, Doppler or phase, based on data of two sensors. The term Detecting and Identifying Processor is used here for convenience, but does not limit the functions that processor 340 may perform.

The processors 330, 335 and/or 340 may make use of receiver memory 346 (shown in FIG. 3A but not in 3B), comprised in memory 325, to store data while performing analysis and calculations, among other uses.

Data links 313 (shown in FIG. 3A but not in 3B) may include, in addition to other components, system center data link 317 and sensor data link 319. These may interface to, respectively, system center 140 and sensors 105, 110, 115, for example. They may be configured to route data directly to its destination, or via a relay or other components, as elaborated with regard to FIG. 1. The interface may be realized by any signaling system or communication components, modules, protocols, software languages and drive signals, and can be wired and/or wireless as appropriate.

Detecting and Identifying Processor 340 may be operatively coupled or connected to Recorder #2 365, which in turn may be operatively coupled or connected to system center data link 317. When Processor 340 succeeds in detecting a signal, or has data indicative of a detected signal, it may send it via the system center data link 317. Recorder #2 365 is a buffer which may store data to be sent, before it is sent over data link 317. This buffering may occur, for example, because system center data link 317 does not have LOS to system center 140, and thus cannot communicate the data immediately. The buffering may also occur, for example, due to the large amount of data to be communicated to 140.

Detecting and Identifying Processor 340 may also be operatively coupled or connected to sensor data link 319. This may enable communication of data between sensors, for example from a detecting sensor to a non-detecting sensor. A buffer or recorder (not shown) may in some cases exist also for this communication. It is not shown, to exemplify the possibility of the traffic on this data link requiring a lower data rate as compared to traffic over system center data link 317, which may require a higher data rate. Data link 319 may have a lower bandwidth capacity, due to for example capacity constraints in the sensor as compared to system center 140, which in some cases may be a larger and/or higher-capacity device.

Recorder #1 363 may be operatively coupled or connected to at least Sampler 330, Signal Processor 335, and Detecting and Identifying Processor 340. For example, 330 and 335 may write samples, and processed samples, respectively, to Recorder #1 363. Processor 340 may access recorder 363, for example, in order to process data stored in 363. It should be noted that other, shorter-term buffers, used for example during signal processing, may exist but are not shown.

Controller functionality 370 may be operatively coupled or connected to some or all the other components and sub-components in the sensor. This interface 373 is therefore shown in a schematic fashion, as a broken line. The individual connections are not depicted, for clarity of the drawing. The functionality 370 may monitor and control all of the processes. Non-limiting example functions that it may perform include: synchronizing; determining whether LOS to 114, 105, 110, 115 exist and thus the data links 317, 319 may communicate when data should be saved to, and accessed from, recorders 363, 365. Similarly, controller functionality 370 may be involved in data reduction, instructing for example processor 340 to save, process and send only a portion of the data received during a defined time interval. In some examples, incoming assistance information sent by a detecting sensor may be sent to the controller, which decides what to do with it, and how it should be used for assisted detection in the non-detecting sensor. Some or all of these functions may be performed by controller processor 374, comprised in processor 320. Non-limiting example data to be stored in controller memory 376, which is comprised in memory 325, may include the bands to be scanned per dwell.

Examples of the above interactions are described further herein with regard to other figures.

FIGS. 3a and 3b illustrate only a general schematic of the system architecture, describing, by way of non-limiting example, one aspect of the presently disclosed subject matter in an informative manner only, for clarity of explanation only. Only certain components are shown, as needed to exemplify the presently disclosed subject matter. Other components and sub-components, not shown, may exist. For example, in some cases, some components may be implemented as analog devices such as filters, instead of as processors. For example, Sampler 330 and/or Signal Processor 335 may in some cases be fully or partly replaced by analog filters. Systems such as those described with respect to the non-limiting examples of FIG. 3, may be capable of performing all, some, or parts of the methods disclosed herein.

It will be understood that that the teachings of the presently disclosed subject matter are not bound by what is described with reference to FIGS. 3a and 3b.

Each system component in FIG. 3 can be made up of any combination of software, hardware and/or firmware, executed on a suitable device or devices, that perform the functions as defined and explained herein. Equivalent and/or modified functionality, as described with respect to each system component, can be consolidated or divided in another manner Thus, in some examples of the presently disclosed subject matter, the system may include fewer, more, modified and/or different components, modules and functions than those shown in FIG. 3. To provide one non-limiting example of this, in some examples the functions of the sub-processors 330, 335 and 340 may be combined into processor 320. One or more of these components can be centralized in one location or dispersed and distributed over more than one location.

Each component in FIG. 3 may represent a plurality of the particular component, possibly in a distributed architecture, which are adapted to independently and/or cooperatively operate to process various data and electrical inputs, and for enabling operations related to signal detection. In some cases multiple instances of a component, may be utilized for reasons of performance, redundancy and/or availability. Similarly, in some cases, multiple instances of a component may be utilized for reasons of functionality or application. For example, different portions of the particular functionality may be placed in different instances of the component.

The communication between the various components of sensor 305, in cases where it is not located entirely in one location or in one physical component, can be realized by any signaling system or communication components, modules, protocols, software languages and drive signals, and can be wired and/or wireless as appropriate.

Figure 4A:
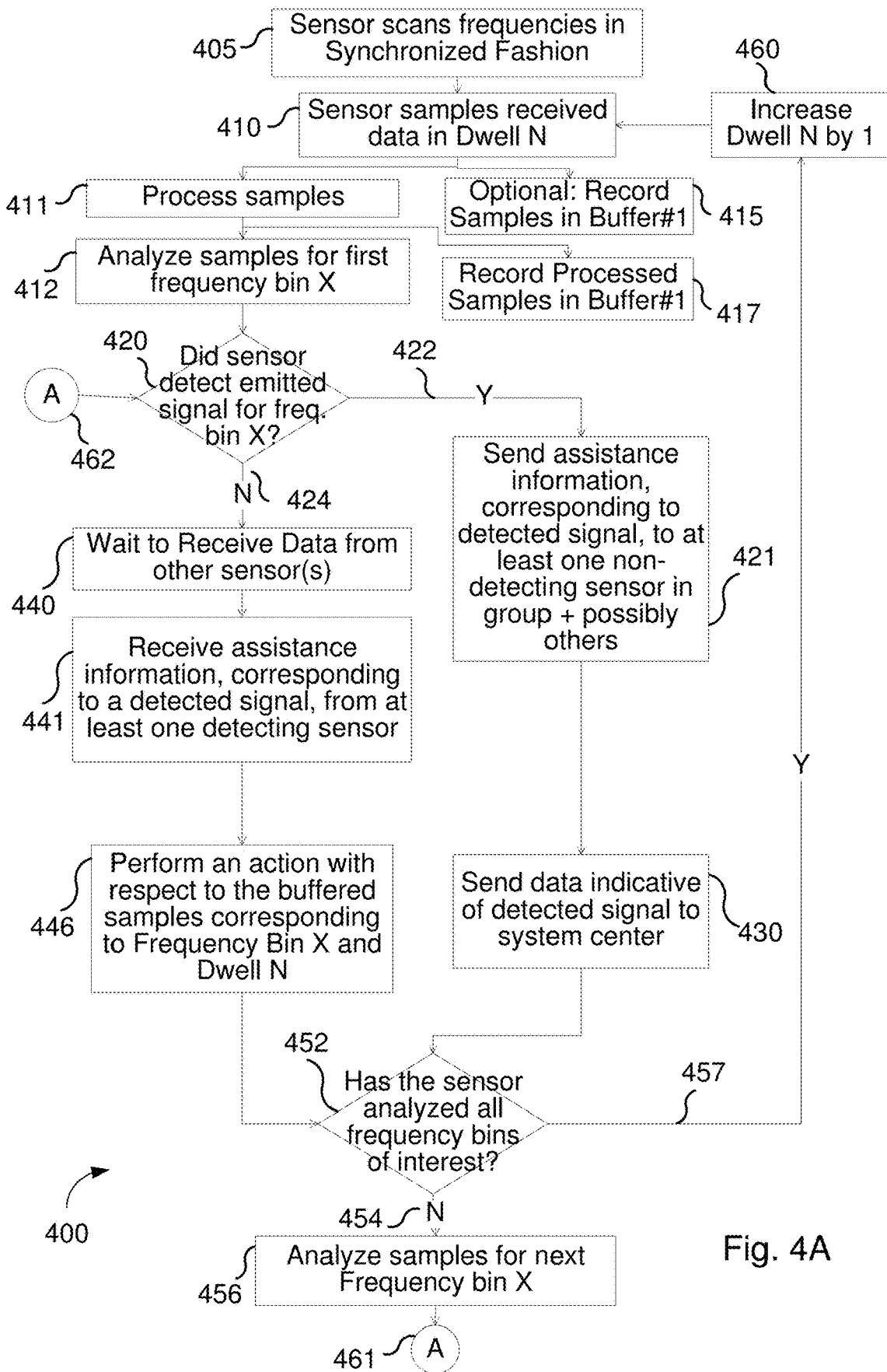
FIGS. 4A to 4C illustrate a flowchart of a generalized example sequence of operations carried out to provide assistance information between sensors, in accordance with certain embodiments of the presently disclosed subject matter.

Turning to FIG. 4A, there is illustrated one example of a generalized flow chart diagram of providing assistance information between sensors, in accordance with certain embodiments of the presently disclosed subject matter. In some embodiments, one or more steps of FIG. 4A may be performed automatically. The flow and functions illustrated in FIG. 4A may for example be implemented in processing circuitry 350, and may make use of components and sub-components described with regard to FIGS. 3A and 3B.

The example flow 400 starts at 405. In step 405, the receiver antennas 310 of sensor 105 may receive electromagnetic transmissions, and may scan the frequencies in a synchronized fashion. All sensors in a selected sensor group may be synchronized, such that all scan the same frequency band 220 during the same dwell N. Controller 370 may control the process, e.g. instructing receiver antennas which band to scan in a particular dwell. The band to be scanned may also change during the process, for example based on updates received by the controller 370 from the system center 140.

In step 410, the sampler 330 may sample data associated with the scanned frequency band 220 that was received during a particular dwell number, shown in the figure as dwell N. Dwell N is an example of a defined time interval during which data indicative of the entire data of a frequency band is received by the sensor. Note that the dwells of all sensors may be synchronized, although their start and end times may in some cases not coincide.

This data sample may in some cases comprise the entire data of a frequency band received by the sensor during the defined interval. In other cases it may comprise only a portion of the frequency band. In example cases, these samples may comprise amplitude and phase information for each sampling time.

In step 415, the sampler may then record this sample data, in, for example, the first recorder 363, for possible future use.

Possibly in parallel with step 415, but not necessarily so, in step 411 the signal processor 335 may process those received samples, by for example filtering them to the frequency domain, thus deriving processed samples. It may use, for example, FFT (Fast Fourier Transform) or some other filtering technique.

In step 417, the signal process may then record this sample data in, for example, the first recorder 363, for possible future use.

Possibly in parallel with step 417, but not necessarily so, in step 412 the detecting and identifying processor 340 may analyze those processed samples that correspond to a first frequency of interest X. This may be for example the frequency bin that corresponds to 222 or 224 in FIG. 2. The analysis may include determining whether data of a sufficient strength above the expected detection level 217 has been received, which would indicate or enable detection of an emitted signal in the frequency bin. It is assumed, in the examples, that only one signal is associated with a bin. In step 420, detecting and identifying processor 340 makes a determination whether a signal emitted by an emitter 120 has been detected corresponding to that frequency bin. That is, it may determine whether the data indicative of the entire data of the frequency band includes a signal emitted by an emitter in the frequency bin. Note that the example discussion with regard to these figures is with respect to frequency bins. However, in some cases, e.g. where an analog filter is used, the signals may correspond to a frequency rather than to a frequency bin. Note that it may also be important, that all sensors that communicate frequency-associated information between them are aware of the format that the information is sent—that is whether frequencies are expressed in terms of a frequency or a frequency bin.

Note that the depiction with regard to FIG. 2 is only a non-limiting example, to illustrate for example that at different points in time different sensors may detect different signals. The example depiction indicated that the emitter frequency fell into one frequency bin. However, in other cases, the emitter frequency may fall, for example, into two frequency bins. Similarly, the example depiction was that at each time interval T1, T2 detection occurred at particular sensors. However, as will be seen further herein with reference to FIG. 9A, for example, in some cases, a signal pulse may last for more than one processing frame, and thus several intervals T1, T2 etc. may pass until detection of a signal pulse is made.

In response to the determination at step 420 being Yes, that the criterion was met, indicated by flow arrow 422, the sensor may be considered a detecting sensor, with respect to the particular frequency bin X and dwell N. For example, in graph 205 of FIG. 2A it may be said that sensor 105 detected signal 222 of the frequency $f_1$ during a defined time interval, for example dwell N, and is a detecting sensor.

In step 421, the detecting and identifying processor 340 may send assistance information, corresponding to the signal emitted by the emitter which sensor 105 detected, to one or more other sensors. These sensors should include at least one non-detecting sensor in the selected sensor group, that is one sensor that did not detect a signal in that particular frequency bin and dwell N, as will be discussed further herein. The information may be sent to all sensors in the group, e.g. via broadcast, or only to those sensors that did not detect the signal. Example cases further herein describe examples of such communication. The assistance information may be sent via sensor data link 319.

In some example cases, the assistance information may not include the entire data that corresponds to the frequency band 220, which was received by the detecting sensor during the defined interval (e.g. dwell N)—which includes a comparatively large amount of data—but rather may include a smaller amount of data. Non-limiting examples of assistance information are described further herein.

In optional step 430, detecting sensor 105 may, in some example cases, send data indicative of the detected emitted signal 222 to another system, for example to system center 140. This data may be sent via data link 317, and may be buffered for some time in second buffer 365. Note that step 430 may occur before step 421, or in parallel, in certain examples.

At step 452, detecting and identifying processor 340 may determine whether all frequency bins of interest (or, in some cases, frequencies of interest) in the scanned frequency band have been analyzed. In some examples, the list of frequency bins of interest may be stored in storage 360, and may be updated by the controller functionality 370 (e g making use of controller processor 374 and controller memory 376).

In response to the determination at step 452 being No, that the criterion was not met, indicated by flow arrow 454, the flow may continue to 456, analysis of samples for the next frequency or frequency bin. The flow then proceeds to "A" (460, 462), looping back to step 420, for determination whether an emitted signal was detected at this next frequency or frequency bin.

In response to the determination at step 452 being Yes, that the criterion was met, indicated by flow arrow 457, the flow may continue to step 460. In 460, the receiver 315, perhaps using the sampler 330, increases the dwell number N by 1, and then loops back to step 410, in which it samples data received during the new dwell N.

Figure 2B:
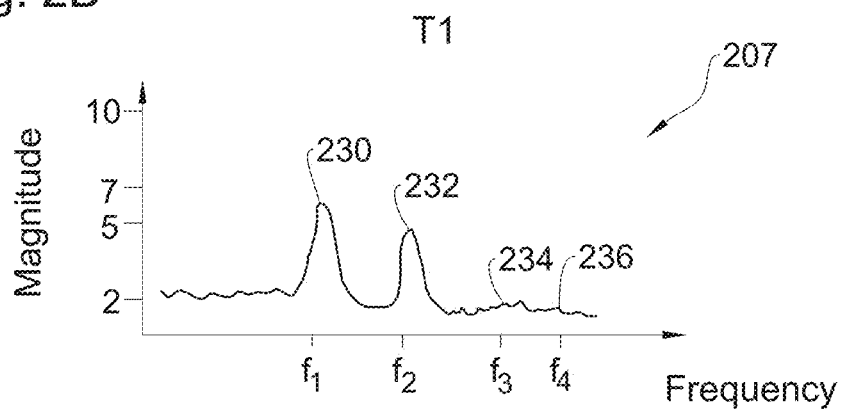
Figure 2C:
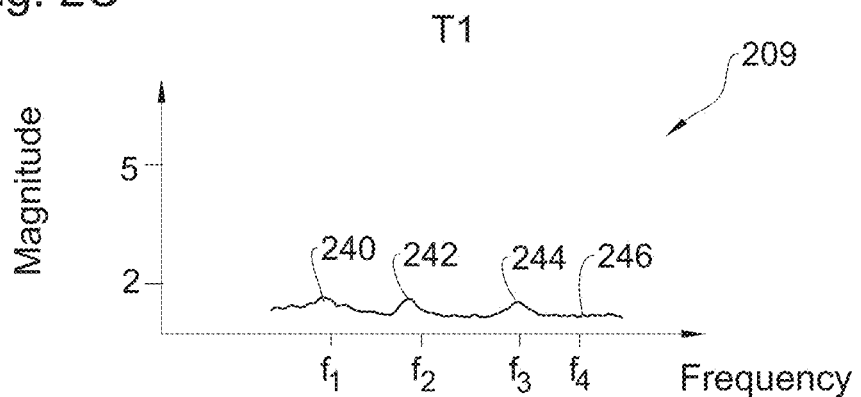

Returning to the decision point in step 420, in response to the determination at step 420 being No, that the criterion was not met, indicated by flow arrow 424, the sensor may be considered a non-detecting sensor, with respect to the frequency bin X and dwell N. For example, in graph 209 of FIG. 2C, depicting electro-magnetic transmission data received at sensor 110, it may be seen that sensor 110 did not detect a signal within the received data 240 corresponding to frequency $f_1$ during the dwell N, since received data 240 is at levels near or below the detection level 217 for this sensor.

Continuing to step 440, the detecting and identifying processor 340 of non-detecting sensor 110 may take no action regarding frequency bin X and dwell N, and may wait regarding such action, until it receives a transmission of assistance information from other sensors, possibly sensors in the same group. In some examples, if no assistance information is sent within a configured time interval, sensor 110 may delete or discard the relevant data that it buffered in steps 415 and/or 417.

In step 441, detecting and identifying processor 340 of non-detecting sensor 110 may receive such a transmission, from at least one detecting sensor, containing assistance information corresponding to an emitted signal detected by the detecting sensor, which in turn corresponds to the same dwell N. This may be, for example, the transmission of assistance information that was done by detecting sensor 105 in step 421. This information may arrive, for example via sensor data links 319.

In step 446, detecting and identifying processor 340 of non-detecting sensor 110 may now have a more enriched set of information regarding the data sample it received in the frequency bin X and dwell N, because the assistance information provided by detecting sensor 105 provided supplemental information that non-detecting sensor 110 did not previously have. Utilizing this provided assistance information, detecting and identifying processor 340 of non-detecting sensor 110 may perform an action with respect to data indicative of the entire data of the frequency band received by sensor 110 during the corresponding defined time interval (e.g. corresponding to dwell N). The actions may correspond to the emitted signal which was received by the at least one non-detecting sensor during the corresponding defined time interval—although sensor 110 has not detected this signal. Non-limiting examples of actions that may be performed are described further herein. In some examples of such actions, it may be said that the non-detecting sensor used the assistance information to perform an assisted detection.

In some example cases, the action performed in step 446 with respect to data indicative of the entire data of the frequency band, received by the non-detecting sensor during the corresponding defined time interval, may be utilized for perform an application task such as determining the location of the relevant emitter 120 at the defined time interval corresponding to these data. In some example cases, this application task may be performed by system center 140.

It should also be noted, as already elaborated with regard to FIG. 1, that sending of the information in steps 421 and 430 may be done, for example, directly, via other sensors, via the system center, via a relay.

In steps 452, 454, 456, 461, 462, and 457, 460, detecting and identifying processor 340 of non-detecting sensor 110 may determine whether all frequencies or frequency bins in the scanned frequency band have been analyzed, and may act accordingly, in a manner detailed herein regarding detecting sensor 105.

It should be noted that the loop shown is for ease of exposition only, to more easily explain concepts. In some examples, steps such as 420, 422, 421, 430, 440, 441, 446, 452, 454, 456, 460, 462 may be performed simultaneously for multiple frequencies or frequency bins. This applies as well to other figures herein that show a similar looping over frequencies or frequency bins. Similarly, in some example cases, these steps may be performed simultaneously for multiple dwells. It may not be necessary to perform these steps only for one dwell at a time.

Before turning to example implementations of the above flow 400, some possible advantages of providing assistance information from a detecting sensor to a non-detecting sensor, in accordance with certain example embodiments of the presently disclosed subject matter, will be mentioned. Thus, in some system architectures 100 of signal detection known in the art, it may be the case that when an insufficient number of sensors in the selected sensor group report in their transmission that they detected a particular signal during a particular time interval, system center 140 may have insufficient information available to be able to perform an application task, such as for example a geo-location attempt, as elaborated above. In some cases providing the application may be considered to work on an "all or nothing" basis, in that an opportunity to perform the task would have been missed, the resources of the system may have been wasted, for example the particular location attempt would fail, even though one or more of the sensors had successfully detected the particular signal, and were able to provide that information to the system center—because one sensor did not detect. The inefficiencies of such a system are evident.

On the other hand, a system architecture 100 that makes use of a method such as shown, for example, in FIG. 4A, may in some cases be able to perform the application task even in cases where an insufficient number of sensors detected a particular signal. This may be achievable because the non-detecting sensor receives the assistance information from one or more detecting sensors, and is able to use this supplementary information to perform an action that may result in the system 100 performing successfully the required task, such as for example locating the particular emitter during the particular defined time interval. It may be said, in some examples, that the system 100, or in some examples the non-detecting sensor 110, performed assisted detection. The system sensitivity may be said to be improved, in that the system as a whole detects the signal and performs the associated task, even where the signal strength and the configuration of system 100 in that time interval is such that one or more sensors were not able to detect it. Similarly, the performance of the task may be achievable in a higher percentage of cases. Also, in some cases, as will be seen e.g. regarding FIGS. 4B, 4C, 7A, only a portion of the received samples, or only certain parameters and calculated results, need be sent to system center 140. In some cases this will enable simplified designs of sensors, since such sensors will not require high-bandwidth communications systems in order to send such data to e.g. system center 140.

It may thus be said that the performance of such a system may be improved, and the utilization of the resources involved (e.g. sensors and system centers) may be more efficient, over a similar system that did not make use of a method such as shown, for example, in FIG. 4A.

Additional example advantages may be presented herein, in the context of particular example implementations of the method of FIG. 4A.

Figure 4B:
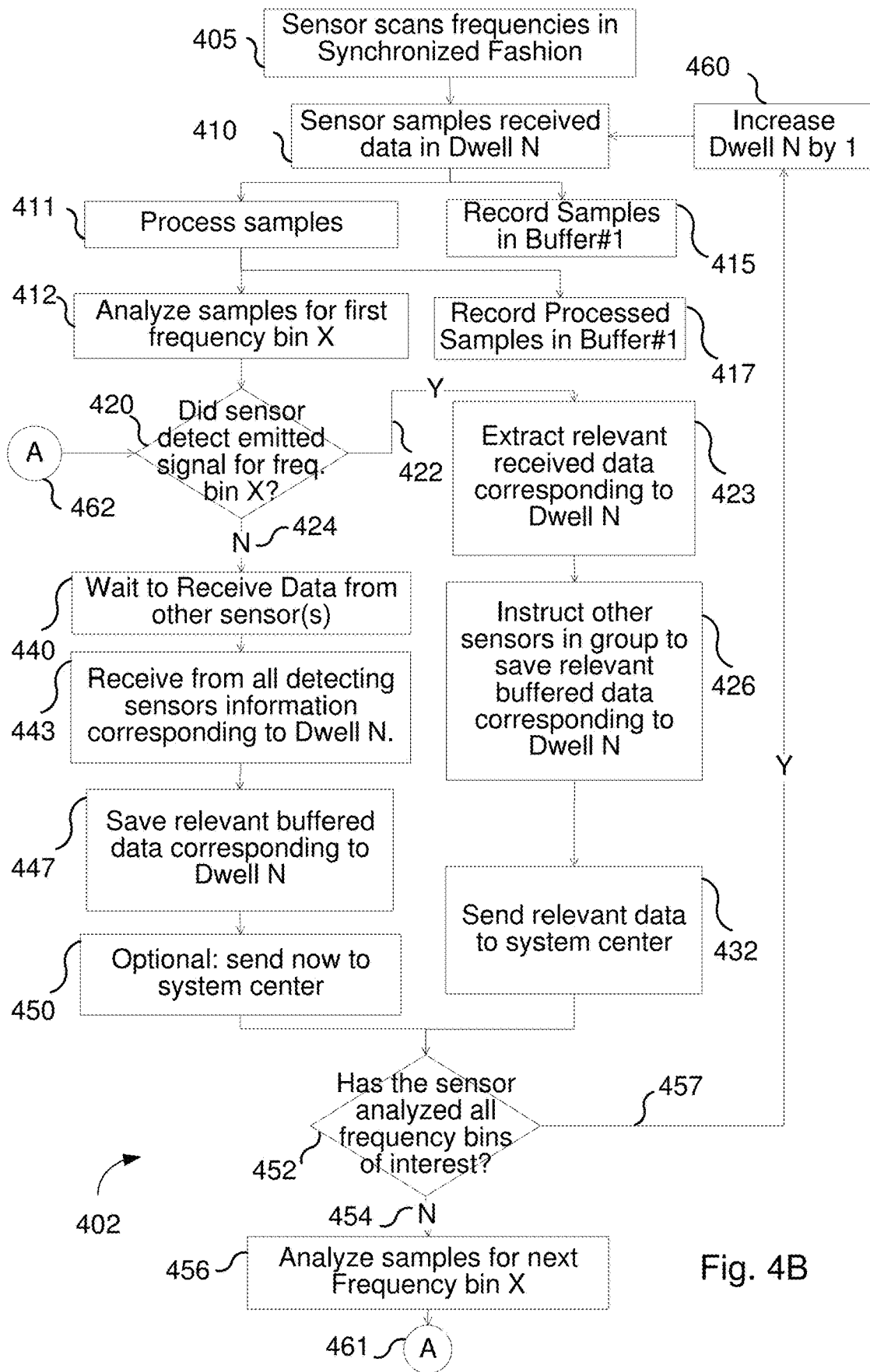

Turning to FIG. 4B, there is illustrated one example of a generalized flow chart diagram of providing assistance information between sensors, in accordance with certain embodiments of the presently disclosed subject matter. The method described with regard to FIG. 4B may in some examples be a specific implementation of the more general method described with regard to FIG. 4A. As such, much of the flow chart may be similar, and elaboration will be made mainly of the steps that may not be similar or identical.

The example flow 402 starts at 405. Steps 405, 410, 411, 415, 412, 417 and 420 may be similar to that described with regard to FIG. 4A. In response to the determination at step 420 being Yes, that the criterion was met, indicated by flow arrow 422, flow proceeds to 423. In step 423 the detecting and identifying processor 340 of the detecting sensor 105 may extract, from the data indicative of the entire received data of the frequency band, relevant data corresponding to the defined time interval, e.g. dwell N. This relevant data may include data indicative of the emitted signal during the defined interval. In some example cases, this may be data indicative of the entire data sample received by sensor 105 during the defined interval, that corresponds to the detected emitted signal. For example, this may be data indicative of the entire received data sample, that correspond to times in which the signal was detected, and the times of those samples. The times of such samples may be referred to as detection times of the at least one detected emitted signal, where the start and end times of each detection may be referred to as defining or bounding a detection time interval. These may be, for example, samples created by sampler 330. In some example cases, this data may be data indicative of the entire received data sample, corresponding to the frequency bin of the detected signal during the defined time interval. These may be, for example, processed samples 222 created by signal processor 335.

In step 426, the detecting and identifying processor 340 of the detecting sensor may send to one or more other sensors assistance information, which may include one or more instructions. The instructions may tell those other sensors that did not detect the particular signal to save relevant data that is in the non-detecting sensors' recorder 363 corresponding to the defined time interval. This relevant data may be data received by the non-detecting sensor during the defined time interval. This data may be data indicative of the entire data sample received by sensor 105 during the defined interval, that corresponds to the emitted signal detected by the detecting sensor 105 during the defined time interval.

In some example cases, such relevant data may be data indicative of the entire received data sample, corresponding to the frequency bin of the detected signal during the defined time interval. This may include processed samples indicative of the frequency bin 222 corresponding to sample detection at the detecting sensor.

For example, such relevant data may be data indicative of the entire received data sample, that correspond to times in which the signal was detected, and the times of those samples. For example, the instruction may include times during which the detecting sensor detected samples, and may instruct the non-detecting sensor to save samples for the same times. In some example cases, the method may account for different times of arrival of the same emitted signal at different sensors. In such a case, the instruction may additionally be that the non-detecting sensor saves samples from a certain time interval before, and a certain time interval (the same or different) after, those times corresponding to sample detection at the detecting sensor. Such time intervals would be determined as part of the engineering of the particular system and application, and would be configured appropriately. This may be one example of data reduction achievable using the methods of the presently disclosed subject matter. In other example cases, the detecting and identifying processor 340 of the detecting sensor 105 would instruct to save all samples or data corresponding to dwell N.

The sensors to receive this instruction information may include at least one non-detecting sensor in the group. This assistance information may be sent via a data link 319. Note that in some example cases, the assistance information will comprise a smaller amount of data, compared to the entire data 223 that corresponds to the frequency band 220.

In optional step 432, the detecting and identifying processor 340 of detecting sensor 105 may, in some example cases, send data indicative of the detected signal 222 to another system, for example system center 140. In some example cases, the data sent may be the pulse parameters set of the detected signal. In other example cases, 105 may send all or most of the entire received data sample 223 of a frequency band, of the particular frequency 222 or frequency bin 222 and dwell N for which the signal was detected by 105. In some examples, 105 may send samples for times indicative of those times corresponding to sample detection at the detecting sensor 105. Note that step 432 may occur before step 426, or in parallel, in certain examples.

In steps 452, 454, 456, 461, 462, and 457, 460, the detecting and identifying processor 340 of detecting sensor 105 may determine whether all frequency bins in the scanned frequency band have been analyzed, and act accordingly, in a manner detailed herein regarding FIG. 4A.

Returning to the decision point in step 420, in response to the determination at step 420 being No, that the criterion was not met, indicated by flow arrow 424, in step 440, the detecting and identifying processor 340 of non-detecting sensor 110 may take no action regarding the frequency bin and dwell N, and may wait regarding such action, until it receives a transmission of signal-related data from other sensors, possibly sensors in the same group. In step 443, the detecting and identifying processor 340 of non-detecting sensor 115 may receive such a transmission, from at least one detecting sensor, containing the assistance information, corresponding to a signal detected by the detecting sensor. This may include the instruction, sent by detecting sensor 105 in step 421, to save data indicative of the signal detected at the detecting sensor 105. The instructions may be received via data link 319, and possibly controller processor 374.

In step 447, non-detecting sensor 110 may use this assistance information to save the relevant data, that is data indicative of the signal detected at the detecting sensor. Examples of such data are described with respect to step 426. Policies configured in sensor 110 may cause it to save the data if at least one detecting sensor instructed it to do so.

Rather than discarding the samples, possibly because they did not indicate detection of a signal, the particular buffer data is, in such a case, saved for at least some amount of time. The data is thus not lost. This buffered data in some example cases may continue to be saved in recorder 363. In other example, cases, this buffered data may be saved elsewhere in storage 360. In some example cases, the time interval for which the buffered data will be saved is configured in the non-detecting sensor. In other example cases, the detecting sensor may have instructed the non-detecting sensor for how long this buffered data should be saved.

In step 450, the non-detecting sensor, e.g. using the detecting and identifying processor 340, may also optionally send to the system center 140 data indicative of the saved sample. For example, it may send at least a portion of the saved data to a system center when communication to the system center is available. In some cases it may send the entire saved data.

In other examples, sensor 110, e.g. using the detecting and identifying processor 340, may save this sample data for a longer time period, and may asynchronously send at a later time this same data, or data corresponding to it, at a later time. This might be done, for example, in a case where LOS is not available at that moment between sensor 110 and system center 140, and thus communication to the system center is available.

In some cases, performance of the steps 426, 447 and/or 450 may be configured in the system 100, due to CPU (central processing unit) or other processing capacity limitations that may prevent non-detecting sensor 110 from performing more complex calculations on the data 223, such as those shown with regard to other example cases described herein. The system center may be capable of utilizing the data sent by non-detecting sensors 110 in step 450, in real time or at a later time, possibly together with data sent by detecting sensors in step 432, to perform an application task such as determining the location of the relevant emitter 120 at the defined time interval corresponding to these data. Thus, in some cases the application task is performed despite the fact that an insufficient number of sensors detected the corresponding signal.

In steps 452, 454, 456, 461, 462, and 457, 460, non-detecting sensor 110 may determine whether all frequency bins in the scanned frequency band have been analyzed, and act accordingly, in a manner detailed herein regarding FIG. 4A.

The method of FIG. 4B may provide, in some cases, certain additional advantages. In some cases, the non-detecting sensor 110 may save and buffer only the data it was instructed to save in step 426, until it is able to send the data to e.g. system center 140. As discussed with respect to step 426, the data to be saved may, in some cases, be less than the entire data received at non-detecting sensor 110. In some cases this will enable simplified designs of sensors, since such sensors will not require a large buffer storage capacity in order to save such data until they are able to communicate with e.g. system center 140. This may be one example of data reduction achievable using the methods of the presently disclosed subject matter.

Figure 4C:
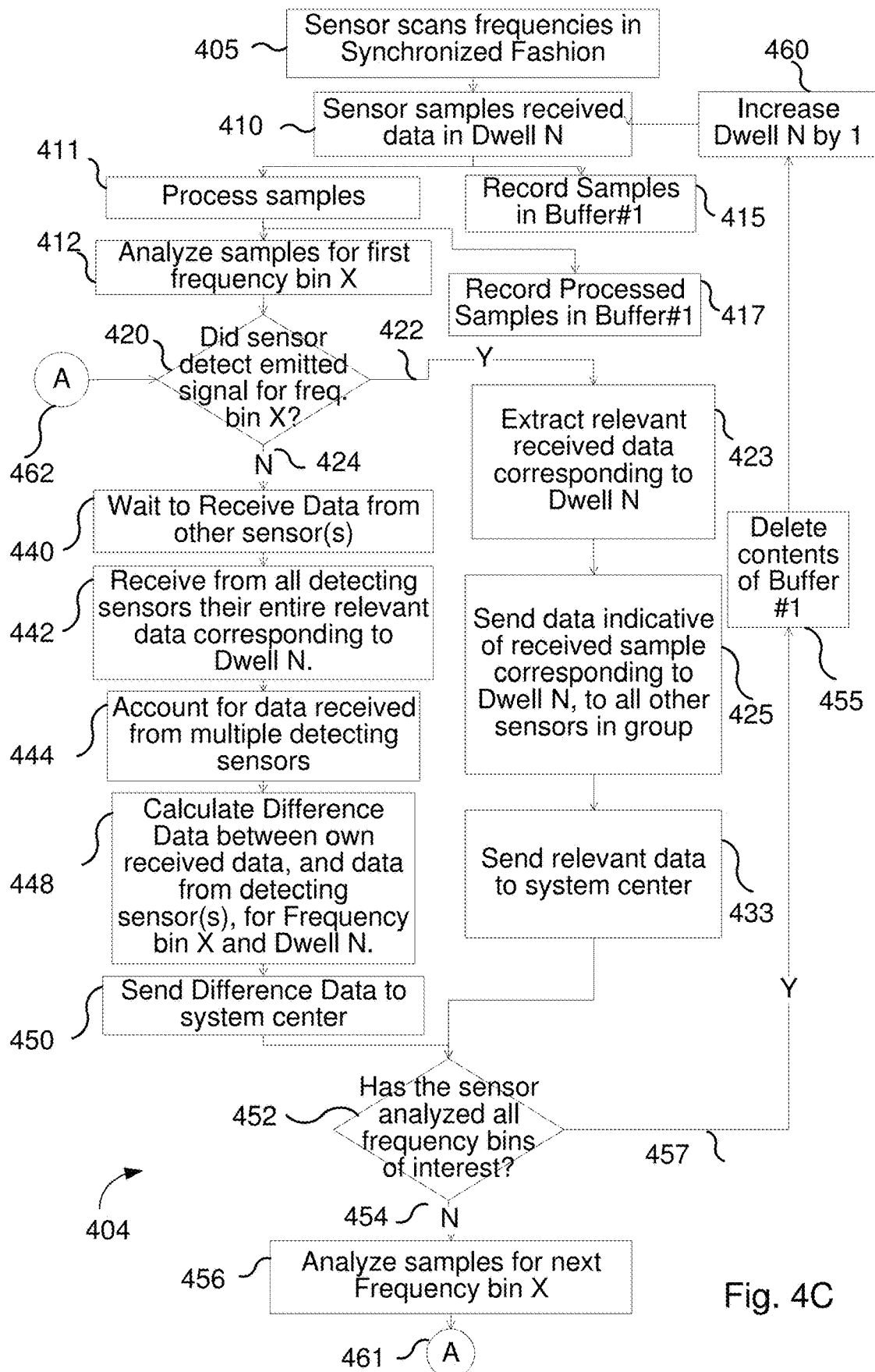

Turning to FIG. 4C, there is illustrated one example of a generalized flow chart diagram of providing assistance information between sensors, in accordance with certain embodiments of the presently disclosed subject matter. The method described with regard to FIG. 4C may be, in some examples, a specific implementation of the more general method described with regard to FIG. 4A. As such, much of the flow chart may be similar, and elaboration will be made mainly of the steps that may not be identical.

The example flow 404 starts at 405. Steps 405, 410, 411, 415, 412, 417 and 420 may be similar to that described with regard to FIG. 4A. In response to the determination at step 420 being Yes, that the criterion was met, indicated by flow arrow 422, in step 423 the detecting and identifying processor 340 of the detecting sensor 105 may extract, from the data, relevant data. This may be data 223 indicative of the entire received data of a frequency band of interest. In some cases this may be data indicative of that portion 222 of the entire received signal that corresponds to the frequency band received by the detecting sensor during the defined time interval, which includes the detected signal. In some example cases, such relevant data may include processed samples 222 indicative of the frequency $f_1$ corresponding to sample detection at the detecting sensor. In some example cases, such relevant data may include samples for times indicative of those times corresponding to sample detection at the detecting sensor.

In step 425, the detecting and identifying processor 340 of the processor 320 of the detecting sensor may send, to one or more other sensors, assistance information. This information may in some cases include data indicative of the entire received data at detecting sensor 105 corresponding to the emitted signal 143 detected at sensor 105. This may be, for example, all of the data extracted in step 423, or some portion of that data. In some examples, this data indicative of the entire received data at detecting sensor may also include parameters associated with the data. On example of this is sending information about frequency bin(s), in a case where the sent data includes samples indicative of the frequency bins(s) corresponding to sample detection at the detecting sensor. In some example cases, sensor 105 may send assistance information to sensors that did not detect the particular emitted signal, as well as possibly to sensors that did detect the particular emitted signal.

It should be noted here, with reference to FIG. 2A, that data indicative of the entire received, such as for example data 222, is of a narrower bandwidth than data 223 corresponding to the entire frequency band 220. In some cases the data of a frequency bin corresponding to a signal comprises about 10%, or even less, of the data of the entire frequency band 220. In some cases the duty cycle of the emitter pulses may be 10% of the time. Thus, samples corresponding only to times of signal pulses may comprise in such cases 10% of the total data sample received. If sensor 105 is configured to send data filtered only on signal times, or only on a frequency bin, it may thus send in some cases data reduced to 10% or less of the received data sample. If the sensor is configured to filter on both frequency bin and signal time, it may send in some cases data reduced to 1% or less of the received data sample. In some examples it may send in some cases data reduced to about 0.1% or less of the received data sample. In some examples it may send in some cases data reduced to about 0.05% or less of the received data sample. The inter-sensor communication interface 160 may thus be considered to require a relatively narrow bandwidth, as compared to communication interfaces which must carry the entire data sample 223. This may be one example of data reduction achievable using the methods of the presently disclosed subject matter.

In step 433, the detecting and identifying processor 340 of the processor 320 of the detecting sensor 105 may send data relevant to the particular application to another system, e.g. system center 140, for further processing. This relevant data may be, for example, all of the data extracted in step 423, or some portion of that data. In some cases, the detecting and identifying processor 340 may determine a set of parameters to send. This may be for example the pulse parameters set for the detected signal, based on the data indicative of the entire received signal 222 that corresponds to the particular frequency $f_1$ for which the signal was detected and dwell N. Also, in example cases where detecting sensor 105 sends also to other detecting sensors, and possibly those sensors send to it, sensor 105 can calculate also difference data, as described further herein with respect to 448, and it can send the difference data as well in step 433. This may even occur if all sensors in a group detected a particular signal. Note also that step 433 may occur before step 425, or in parallel, in certain examples.

In steps 452, 454, 456, 461, 462, and 457, 460, detecting sensor 105 may determine whether all whether all frequency bins in the scanned frequency band have been analyzed, and act accordingly, in a manner detailed herein regarding FIG. 4A.

Returning to the decision point in step 420, in response to the determination at step 420 being No, that the criterion was not met, indicated by flow arrow 424, in step 440, the detecting and identifying processor 340 of non-detecting sensor 110 may take no action regarding the frequency bin and dwell N, and may wait regarding such action, until it receives a transmission of signal-related data from other sensors, possibly sensors in the same group. Waiting is one non-limiting example implementation of the method of step 440, and of step 740, in all of the relevant Figures. In other examples, non-detecting sensor 110 may request other sensors in the selected sensor group to provide assistance information. In other examples, non-detecting sensor 110 may wait for a certain configured time, and, after timeout, it may request other sensors in the selected sensor group to provide assistance information.

In step 442, non-detecting sensor 110 may receive such a transmission, from at least one detecting sensor, containing assistance information, containing relevant data corresponding to a signal detected by the detecting sensor. This may include the data indicative of the entire received data sample at the detecting sensors corresponding to the detected emitted signal 143, and any relevant accompanying parameters, which was sent by detecting sensor 105, and possibly others, in step 425.

The next step, 444, may be trivial, if only one detecting sensor 105 sent data in 425 that was received in 442. In such a case, the basis for the steps following 444 is the data sent from 105. However, it is possible that more than one detecting sensor, e.g. both 105 and 115, may send data in their respective steps 425 that is received by 110 in step 442. Consider the example case depicted in FIGS. 2A, 2B, 2C. Looking at frequency $f_1$, it can be seen that both sensor 105 and 115 detected signals, at 222 and 230 respectively. Sensor 110 did not detect a signal at that frequency—see sample 240. In such a case, sensor 110 must account for the fact that two different sensors in the selected sensor group sent it in step 442 signal-related data. One non-limiting example method for accounting for this situation is to have configuration data stored in storage 360 of sensor 110, for example, which indicate a priority order for choosing the detecting sensor. Another example method is choosing the first signal received in step 442. Another example method is performing an averaging calculation, or other similar calculation that makes use of the data received from each of the detecting sensors which sent data indicative of the entire received data sample at the detecting sensors—in this case, for example, data 222 and 230.

In step 448, the detecting and identifying processor 340 of non-detecting sensor 110 may take assistance information, e.g. the data indicative of the entire data sample received from the detecting sensors 105 and/or 115 corresponding to the emitted signal which was detected by them (e.g. corresponding to 222, 230, or some calculation based on them), and also non-detecting sensor 110's own data indicative of the entire data 240 received during the corresponding defined time interval (e.g. dwell N), corresponding to that same emitted signal which was detected by sensors 105 and/or 115. The processor may utilize the assistance information to extract, from the data indicative of the entire data of the frequency band, that was received by the non-detecting sensor during the corresponding defined time interval, data indicative of the emitted signal received by the non-detecting sensor during the corresponding defined time interval. For example, the processor may calculate difference data associated with the two sets of data, involving differential parameters such as TOA, Doppler or phase, using known techniques. Such a difference data result is an example of data indicative of the emitted signal received by the non-detecting sensor 110 during that corresponding defined time interval. In some example cases, the process of calculating the difference data may involve detection of the emitted signal by the non-detecting sensor 110. It may be said that the non-detecting sensor used the assistance information to perform an assisted detection.

The extraction of data, as disclosed with reference to step 448, may be an example of the non-detecting sensor performing an action with respect to data indicative of an entire data of the frequency band received by the non-detecting sensor during a corresponding defined time interval, where the action corresponds to the emitted signal received by the non-detecting sensor during the corresponding defined time interval.

In step 450, the detecting and identifying processor 340 of non-detecting sensor 110 may send the difference data to the system center 140. Though not shown, the system center may take data received in steps 433 and 450 to perform the application task, for example to determine the geographic location of an emitter such as 120.

In steps 452, 454, 456, 461, 462, and 457, 460, non-detecting sensor 110 may determine whether all frequency bins in the scanned frequency band have been analyzed, and act accordingly, in a manner detailed herein regarding FIG. 4A.

In some example cases, a method such as disclosed with regard to FIG. 4C may have some advantage over a method such as disclosed with regard to FIG. 4A. For example, in the method disclosed in FIG. 4A, the non-detecting sensor 110 may have to save buffered data, such as data received during the corresponding defined time interval, indicative of the at least one emitted signal detected by the at least one detecting sensor during the defined time interval, until communication to the system center is available. Such data may be buffered in Recorder #2 365. In some examples of the method disclosed in FIG. 4C, the non-detecting sensor 110 may calculate difference data, and send that on in step 450 when communication with the system center is available, without having to buffer after the calculation the above data received during the corresponding defined time interval. The non-detecting sensor may in some cases buffer only the difference data. The non-detecting sensor may not be required to buffer data samples until communication to the system center is available, while still being able to perform extraction of the data indicative of the at least one emitted signal. This may be one example of data reduction achievable using the methods of the presently disclosed subject matter.

Figure 5A:
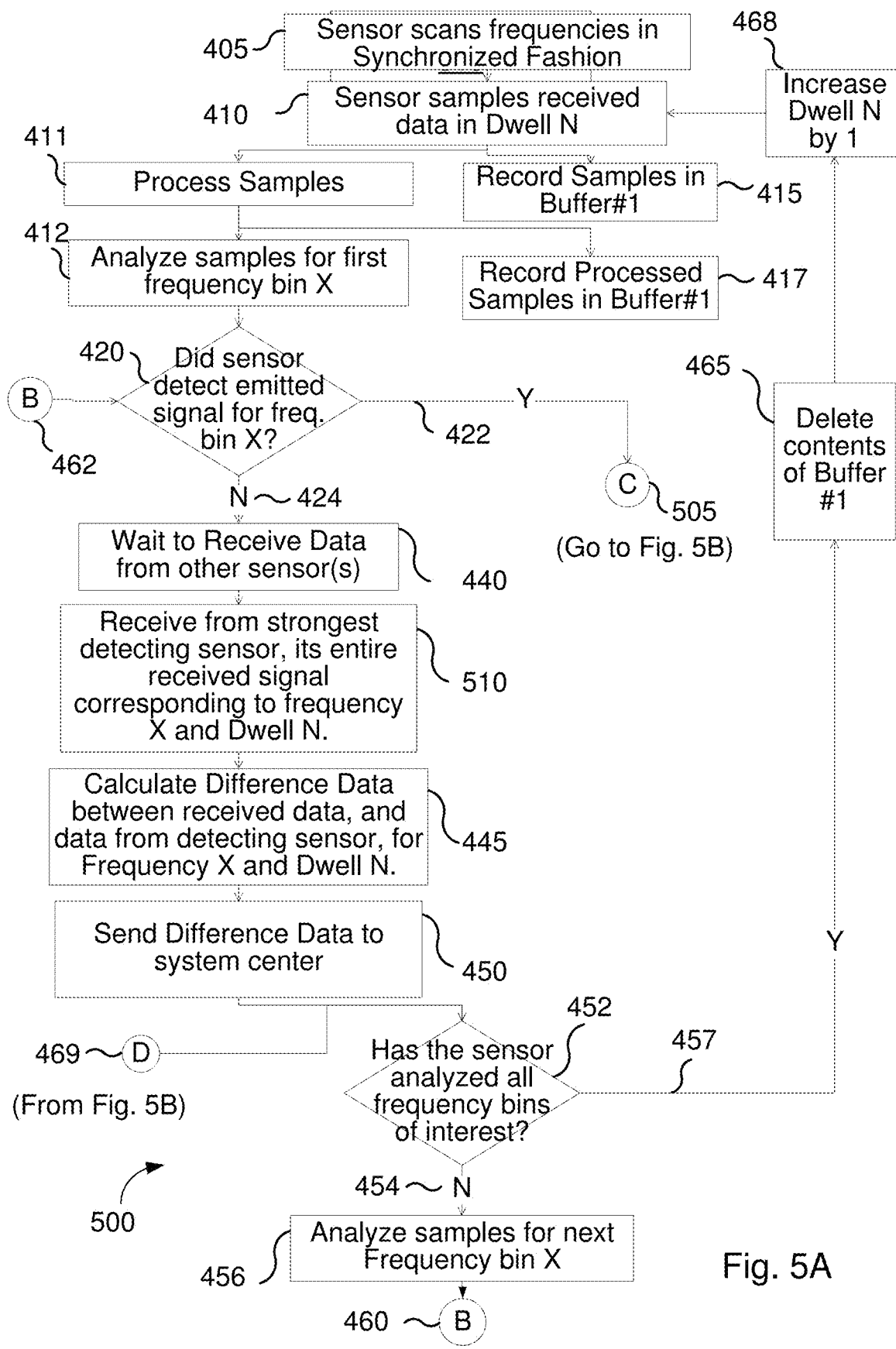
FIGS. 5A to 5B illustrate a flowchart of a generalized example sequence of operations carried out to provide assistance information between sensors, in accordance with certain embodiments of the presently disclosed subject matter.
Figure 5B:
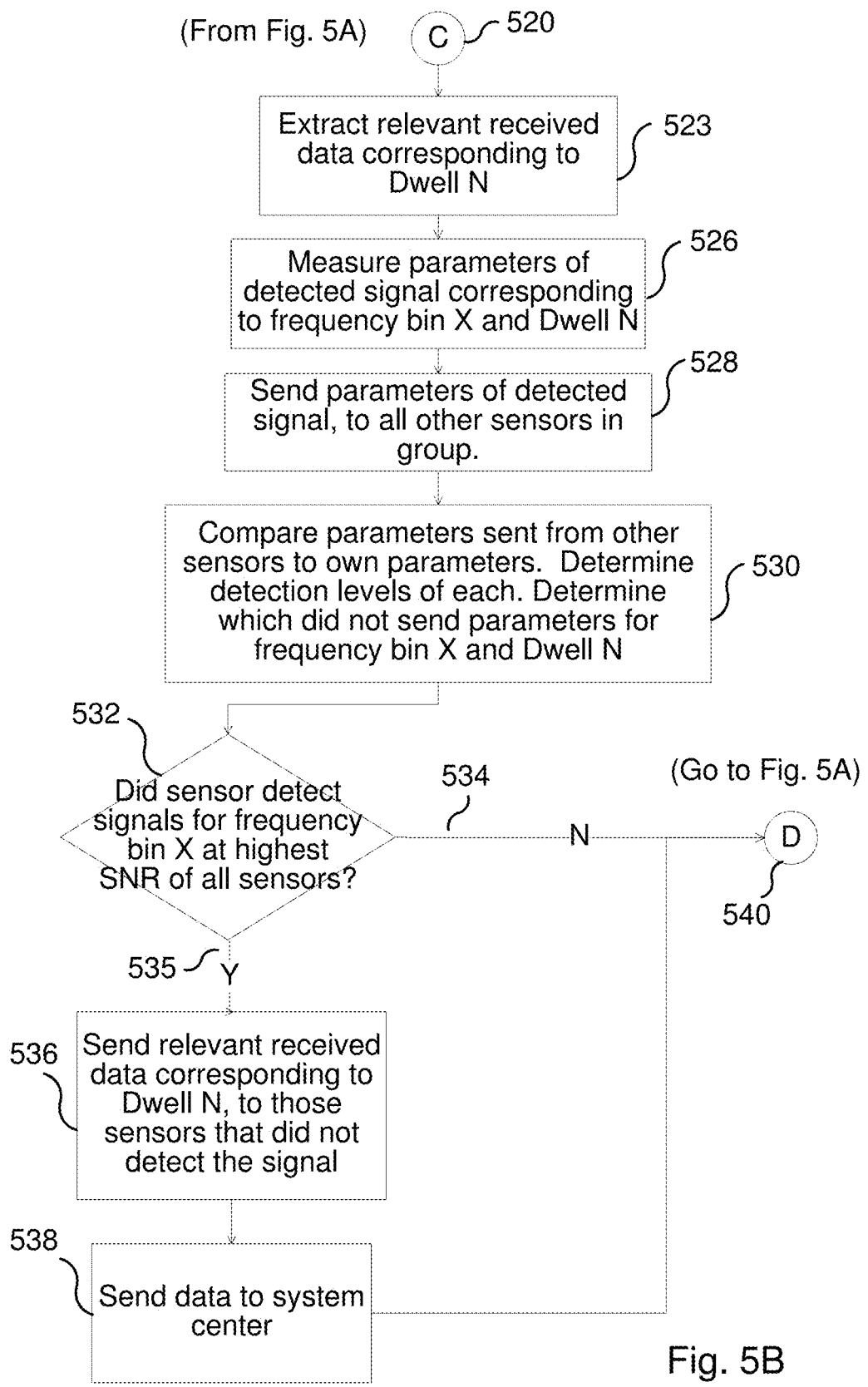

Turning to FIGS. 5A and 5B, there is illustrated one example of a generalized flow chart diagram of providing assistance information between sensors, in accordance with certain embodiments of the presently disclosed subject matter. The method described with regard to FIG. 5 has similarities to the method described with regard to FIG. 4C. As such, much of the flow chart may be similar, and elaboration will be provided mainly of the steps that may not be identical or similar.

The example flow 404 starts at 405. Steps 405, 410, 411, 415, 412, 417 and 420 may be similar to that described with regard to FIG. 4A. In response to the determination at step 420 being Yes, that the criterion was met, indicated by flow arrow 422, proceed to FIG. B (505, 520). In step 523 the detecting and identifying processor 340 of the detecting sensor 105 may extract, from the data, relevant data. This may be data 223 indicative of the entire received data of a frequency band of interest. In some cases this may be data indicative of that portion 222 of the entire received signal that corresponds to the frequency band 220 received by the detecting sensor during the defined time interval, which includes the detected signal. In some example cases, such relevant data may include processed samples 222 indicative of the frequency $f_1$ corresponding to sample detection at the detecting sensor. In some example cases, such relevant data may include samples for times indicative of those times corresponding to sample detection at the detecting sensor.

In step 526, the detecting and identifying processor 340 of the processor 320 of the detecting sensor may measure or determine parameters of data extracted in step 523, that relate to detected signals. These parameters may be indicative of the detected emitted signal, and may be indicative of Signal to Noise Ratio of the detected emitted signal. For example, it may measure, calculate or estimate the pulse parameter set, corresponding to the frequency bin X and the dwell number N. In the case of a signal that is composed of multiple repetitions of pulses, it may also determine these parameters for some or all pulses, and it may also determine the PRI, the number of pulses and the average SNR across pulses.

In step 528, detecting and identifying processor 340 may send some or all of these parameters, determined in step 523, to some or all of the other sensors in the relevant selected sensor group. The parameters that are sent may be referred to as first information indicative of the detected emitted signal, that is sent prior to the step of sending assistance information to the sensors that may require assistance information.

In step 530, sensor 105 has received these same parameters, this same first information, indicative of detection of the same emitted signal by other sensors, from some or all of the other sensors in the selected sensor group. It may compare its own parameters to those received from the other sensors, to determine which assistance information, if any, should be sent to each one of at least one of other sensors in the selected sensor group. For example, it may determine which sensors did not send parameters, and thus should be assumed to not have detected the particular signal and be considered non-detecting sensors. It may also determine whether it received the signal at a higher magnitude or SNR than the other sensors that detected. Note also, that in the case of a signal that is composed of multiple repetitions of a pulses, sensor 105 may also measure these parameters for some or all pulses, and it may also determine PRI and average SNR across pulses.

In step 532, the detecting and identifying processor 340 of the detecting sensor 105 may determine whether it detected the signal at the highest SNR. In response to the result of the determination being Yes, that the criterion was not met, indicated by flow arrow 535, the processor 340 may, in some cases, send in step 536 the data described with respect to 425, only to those sensors that did not report detecting that signal. In this sense, in step 532 the sensor 105 may have determined which assistance information, if any, should be sent to each one of the other sensors in the selected sensor group. Note that detecting the signal at the highest SNR is one example criterion for determining which sensor should send assistance information per signal. In some example cases, where the signal is composed of multiple repetitions of pulses, the number of repetitions may be another example criterion. For example, if sensor 105 detected only 3 pulses at magnitude 10, but sensor 115 detected 40 pulses at a somewhat lower magnitude of 9, the determination may be made that sensor 115 should send assistance information for that signal.

Note that this determination may be done per frequency or frequency bin, and separately per defined time interval. Which sensors received, and which received at highest SNR, may vary per bin and per time interval. Referring to FIGS. 2A-2C, it may be seen that at time T1, sensor 105 received the signal 222 of $f_1$ at a magnitude of about 10, while sensor 115 received the same signal 230 at a magnitude of about 7, and sensor 110 received the same signal 240 at a magnitude of about 2, which is under detection level 217. In this case, only 105 will send data in step 536, and it will send only to one sensor, 110. By comparison, regarding $f_2$, sensor 115 received it 232 at about a level of 5, while the other two sensors did not detect it at all (224, 242). In this case, 115 will send data in step 536 to multiple sensors, 105 and 110. Regarding $f_4$, none of the sensors detected the signal (228, 236, 246), and thus none will send data in step 535. Note also that in the next time interval, T2, (FIGS. 2D-2F), the detection levels may be very different per sensor. For example, in T2 the strongest detection of the signal corresponding to $f_1$ may be by sensor 115 (see 260), and sensor 110 may also detect it (see 270), while now sensor 105 did not detect at all 250. An example is also shown of $f_2$ in time T2, where all three sensors in the selected sensor group detected the signal (252, 262, 272), and thus for that case none will send assistance information for $f_2$. For f4, which was not detected at all in T1, now in T2 sensor 110 is the strongest (see 256, 266, 276), and it will send to the other two sensors.

Note also that the depiction with regard to FIG. 2 is only a non-limiting example, to illustrate for example that at different points in time different sensors may detect different signals. The example depiction indicated that the emitter frequency fell into one frequency bin. However, in other cases, the emitter frequency may fall, for example, into two frequency bins. Similarly, the example depiction was that at each time interval T1, T2 detection occurred at particular sensors. However, as will be seen further herein with reference to FIG. 9A, for example, in some cases, a signal pulse may last for more than one processing frame, and thus several intervals T1, T2 etc. may pass until detection of a signal pulse is made.

Note also, that if the detecting sensor 105 received no first information, regarding a signal that it detected, from any of the other sensors in the selected sensor group, it may determine that it, sensor 105, detected the signal at the highest SNR.

In step 538, the detecting and identifying processor 340 of the processor 320 of the detecting sensor 105 may send data relevant to the particular application to another system, e.g. to system center 140, for further processing. This relevant data may be, for example, all of the data extracted in step 523, or some portion of that data. In some cases, it may for example be the pulse parameters set parameter for the detected signal. Note that step 538 may occur before step 536, or in parallel, in certain examples.

In response to the determination 532 being "No", that the criterion was not met, indicated by flow arrow 534, no special action is taken. Steps 534 and 536, 538 then proceed to 540, 469. In steps 452, 454, 456, 461, 462, and 457, 460, detecting sensor 105 may determine whether all whether all frequency bins in the scanned frequency band have been analyzed, and act accordingly, in a manner detailed herein regarding FIG. 4A.

Returning to the decision point in step 420 of FIG. 5A, in response to the determination at step 420 being No, that the criterion was not met, indicated by flow arrow 424, in step 440, the detecting and identifying processor 340 of non-detecting sensor 110 may take no action regarding the frequency bin and dwell N, and may wait regarding such action, until it receives a transmission of signal-related data from other sensors in the same group. In step 510, non-detecting sensor 110 may receive such a transmission, from only the strongest detecting sensor (e.g. the one with the highest SNR), containing assistance information, containing relevant data corresponding to a signal detected by the detecting sensor. This may include the data which was sent by detecting sensor 105, in step 536.

The next steps, 445 and 450, may be identical or similar to steps 448 and 450 in FIG. 4C. It may be said that the non-detecting sensor used the assistance information to perform an assisted detection.

In steps 452, 454, 456, 461, 462, and 457, 460, non-detecting sensor 115 may determine whether all frequency bins in the scanned frequency band have been analyzed, and act accordingly, in a manner detailed herein regarding FIG. 4A.

A possible advantage of the example depicted with regard to FIG. 5, as compared to that depicted with regard to FIG. 4C, is that only the strongest sensor will send the assistance information, and it will send it only to those sensors that need it, that is to those sensors that did not detect. This may yield a lower total utilization of the bandwidth of the inter-sensor communication 160. A case in FIG. 5 where the detecting sensor sends the first information to all of the other sensors in the group, in step 528, and not to only some of them, may in some cases be more advantageous. This may be one example of data reduction achievable using the methods of the presently disclosed subject matter.

It should also be noted here, that there may be cases where a sensor 105 detects an emitted signal, but it does not detect the signal in a manner that enables it to perform parameter estimation. This may be one example factor in choosing the appropriate assistance information to send. Thus, in some examples the assistance information may include measured, calculated, estimated or otherwise determined parameters. In other examples, the assistance information may not include such parameters, but may include only, for example, samples of data and/or instructions to other sensors to save receive data.

Turning to FIG. 6, there are illustrated generalized example representations of types of signals, in accordance with certain embodiments of the presently disclosed subject matter. In graph 605, signal 630 depicts, in a very generalized sense, a coherent signal. The phase of the signal stays continuous. Pulses 620 are shown as well. In graph 610, signal 640 depicts a non-coherent signal. Note, for example, at points 642, 645, 648 that there are discontinuities in the signal. The phase changes at those point.

Note that the methods of all of the Figures in the presently disclosed subject matter may be applicable, in example cases, to both coherent and non-coherent signals.

Figure 7A:
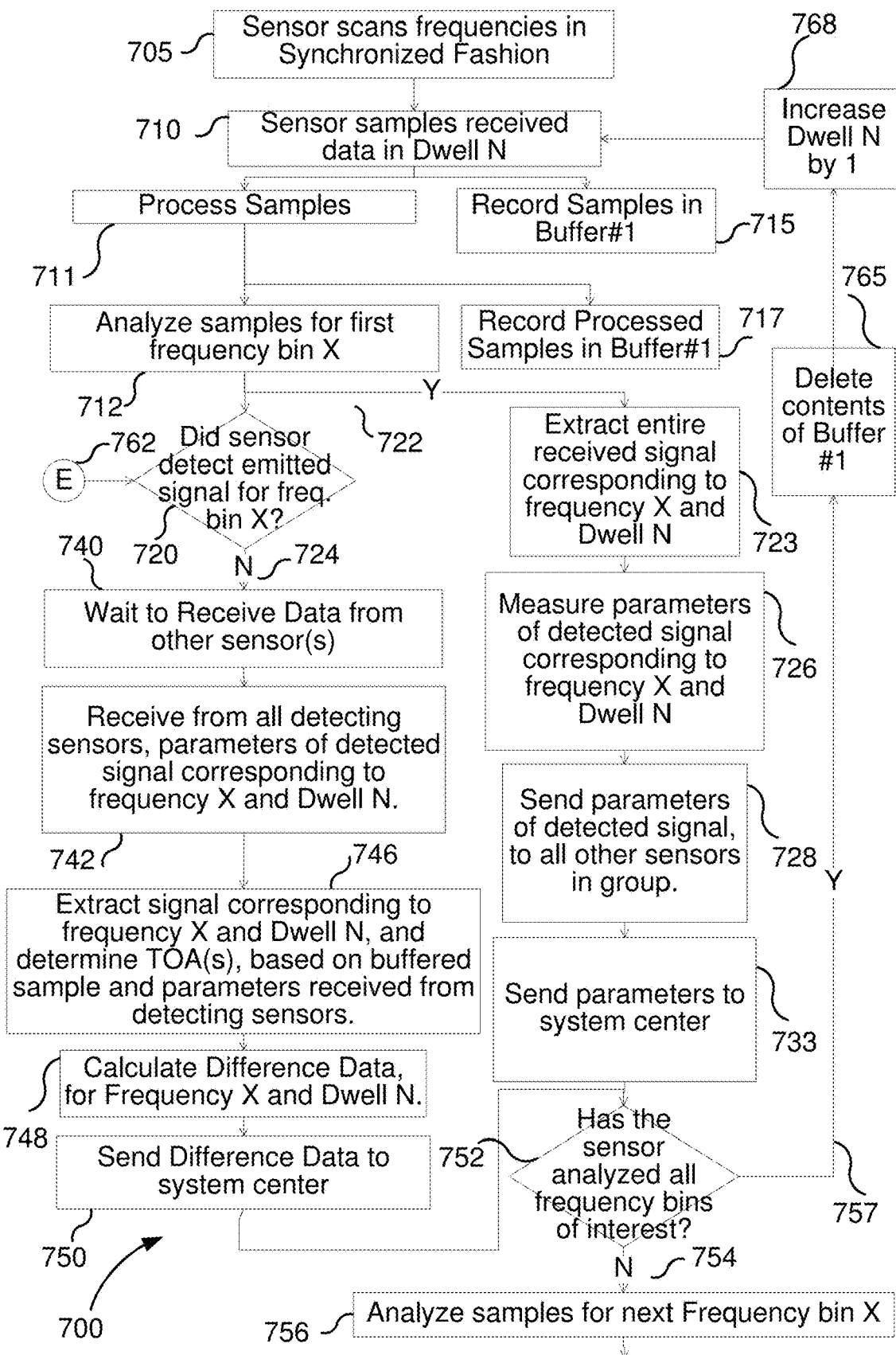
FIG. 7A illustrates a flowchart of a generalized example sequence of operations carried out to provide assistance information between sensors, in accordance with certain embodiments of the presently disclosed subject matter.

Turning to FIG. 7A, there is illustrated one example of a generalized flow chart diagram of providing assistance information between sensors, in accordance with certain embodiments of the presently disclosed subject matter. The method described with regard to FIG. 7A may be a specific implementation of the more general method described with regard to FIG. 4A. As such, much of the flow chart may be similar, and elaboration will be made mainly of the steps that may not be identical. In a non-limiting example case, the method of FIG. 7A may be utilized, if the signal is coherent. An example of coherent signal was described herein with respect to FIG. 6.

The example flow 700 starts at 405. Steps 705, 710, 711, 715, 712, 717 and 720 may be similar to that described with regard to 405, 410, 411, 415, 412, 417 and 420 of FIG. 4A. In response to the determination at step 720 being Yes, that the criterion was met, flow arrow 722, in step 723 the detecting and identifying processor 340 of the detecting sensor 105 may extract from the data indicative of the entire received data of the frequency band, relevant data corresponding to the defined time interval, e.g. to dwell N. This relevant data may include data indicative of the emitted signal during the defined interval. In some example cases, this may be data indicative of the entire data sample received by sensor 105 during the defined time interval, that corresponds to the detected emitted signal. For example, this may be data indicative of the entire received data sample, that correspond to times in which the signal was detected, and the times of those samples. The times of such samples may be considered a second defined time interval of the at least one detected emitted signal. These may be, for example, samples created by sampler 330. In some example cases, this data may be data indicative of the entire received data sample, corresponding to the frequency or frequency bin of the detected signal during the defined time interval. These may be, for example, processed samples 222 created by signal processor 335.

In step 726, the detecting and identifying processor 340 of the detecting sensor 105 may measure and calculate values of parameters that correspond to the emitted signal that the sensor detected. In some example cases, these parameters may include the frequency or frequency bin or frequency bins for which the emitted signal was detected, the pulse width (PW), the dwell number, time or times (e.g. TOA) corresponding to the one detected emitted signal (e.g. times during which the emitted signal was detected), the Pulse Repetition Interval (PRI) and the number of pulses that were detected for that particular emitter. It may also measure magnitude-related parameters such as, for example, SNR. Pulse width may refer to the time interval between the estimated beginning and ending of an emitted pulse that was detected. PRI may refer to the time interval between the beginning of consecutive pulses emitted by a particular emitter. It may be relevant, for example, in cases where the signal is a series of pulses with periodic repetition.

It should also be noted that, for simplicity of exposition, the discussion and figures herein assume a constant PRI. In some cases, the PRI value may vary between some or all consecutive pulses. In that sense, the PRI parameter may be in fact a number of PRIs. The PRI parameter sent in assistance information (in step 728 below) may thus, in some cases, be several PRIs, or a range of PRI values for the signal, or an average PRI, or a PRI with a tolerance. Similarly, the discussion assumes constant PW. In cases where PW is not constant, the PW parameters may be several PWS, or a range of PW values for the signal, or an average PW, or a PW with a tolerance.

The sensor may also measure modulation-related parameters. It may also estimate the accuracy of some or all of the parameters. Note that some of these parameters may be sent within a pulse parameters set.

In step 728, the detecting and identifying processor 340 of the detecting sensor 105 may send, to one or more other sensors in the selected sensor group, assistance information. This information may in some cases include one or more sets, of some or all of the parameter values, measured and calculated in step 726. In some examples, this assistance information will be sent by sensor 105 to all of the other sensors in the sensor group. Note that in some examples, the sending of certain measured parameters is not necessary. For example, if the assistance information includes the TOA of the first pulse, and each of the PRIs between pulses, there may be no need to send the parameter "number of pulses"—since the sensor that receives the assistance information can calculate this. For example, if the assistance information includes the TOAs of each pulse, there may be no need to send the parameter(s) PRI—since the sensor that receives the assistance information can calculate this.

It should be noted here, that this assistance information that consists of such parameter values, rather than of portions of received samples, is of a narrower bandwidth than data 223 corresponding to the entire frequency band 220. The size of the data associated with the parameter values may in some cases be less than 5000 bits per signal per dwell. The size of the data associated with the parameter values may in some cases be less than 1000 bits per signal per dwell. The size of the data associated with the parameter values may in some cases be less than 500 bits per signal per dwell. The inter-sensor communication interface 160 may thus be considered to require a relatively narrow bandwidth, as compared to communication interfaces which must carry the entire data sample 223. This may be one example of data reduction achievable using the methods of the presently disclosed subject matter.

In step 733, the detecting and identifying processor 340 of the processor 320 of the detecting sensor 105 may send data relevant to the particular application to another system, e.g. system center 140, for further processing. This relevant data may be, for example, the data sent to other sensors in step 728, or some portion of that data. In some cases, it may be other parameters. Note that step 733 may occur before step 728, or in parallel, in certain examples.

In steps 752, 754, 756, 761/762 (E), and 757, 760, detecting sensor 105 may determine whether all whether all frequencies or frequency bins in the scanned frequency band have been analyzed, and act accordingly, in a manner detailed herein regarding steps 452, 454, 456, 461, 462, and 457, 460 of FIG. 4A.

Returning to the decision point in step 720, in response to the determination at step 720 being No, that the criterion was no met, flow arrow 724, in step 740, the detecting and identifying processor 340 of non-detecting sensor 110 may take no action regarding the frequency bin X and dwell N, and may wait regarding such action, until it receives a transmission of assistance information from other sensors, possibly sensors in the same selected sensor group. In some examples, if no assistance information is sent within a configured time interval, sensor 110 may delete or discard the relevant data that it buffered in steps 715 and/or 717.

In step 742, non-detecting sensor 110 may receive such a transmission, from at least one detecting sensor, containing assistance information, containing parameter values corresponding to a signal detected by the detecting sensor. This may include the parameter values which were sent by detecting sensor 105, and possibly others, in step 728.

In the next step, 746, the non-detecting sensor makes use of the assistance information parameters, to perform an assisted detection. If only one detecting sensor 105 sent data in 728 that was received in 742, the basis for the step 746 may be the data sent from 105. In some cases, it is possible that more than one detecting sensor, e.g. both 105 and 115, may send data in their respective steps 728 that is received by 110 in step 742. In such a case, sensor 110 must account for the fact that two different sensors in the selected sensor group sent it signal-related parameters in step 728. One non-limiting example method for accounting for this situation is to have configuration data stored in storage 360 of sensor 110, for example, which indicate a priority order for choosing the detecting sensor. Another example method is choosing the first signal received in step 442. Another example method is choosing the assistance information indicative of greatest SNR. In other examples, accuracy will also be considered. Another example is to assign weights to each aspect, to score the assistance information from each, and to choose based on scoring.

The assistance information received in 728 may in some cases be utilized to extract, from the data indicative of the entire data of the frequency band received by sensor 110 during the defined time interval, data indicative of the emitted signal received by it during the defined time interval. This extraction of data may include determining at least a Time of Arrival (TOA) value of the emitted signal at the non-detecting sensor. This TOA may be an example of data indicative of the emitted signal received by the non-detecting sensor 110 during that defined time interval. Note also that in some example cases, e.g. cases of a repeated signal, there may be more than one Time of Arrival.

In some example cases, this determination may involve performing actions to filter out noise in the data indicative of the entire data of a frequency band received by sensor 110, thereby detecting the emitted signal. In some examples, elaborated on further herein, the actions to filter out noise may involve integrating a portion, of the data indicative of the entire data of the frequency band, that corresponds to the emitter frequency, and corresponds to time intervals corresponding to the detected emitted signal. The emitter frequency, and these time intervals, may be known from the assistance information.

The extraction of data, as disclosed with reference to step 746, may be an example of the non-detecting sensor performing an action with respect to data indicative of an entire data of the frequency band received by the non-detecting sensor during a corresponding defined time interval, where the action corresponds to the emitted signal received by the non-detecting sensor during the corresponding defined time interval.

In step 748, the detecting and identifying processor 340 of non-detecting sensor 110 may in some examples calculate or determine difference data, involving differential parameters such as TOA, Doppler or phase, using known techniques, based on the outputs of step 746 and the parameter values that it received in 742. In the case of, for example, geolocation, this differential data may be used to locate the emitter.

Such a difference data result is an example of data indicative of the emitted signal received by the non-detecting sensor 110 during that defined time interval. In step 750, the detecting and identifying processor 340 of non-detecting sensor 110 may send the difference data to the system center 140. It may also send the TOA and/or other parameters value(s). Though not shown, the system center may utilize data received in steps 733 and 750 to perform the application task, for example to determine the geographic location of an emitter such as 120.

In steps 752, 754, 756, 761/762 (E), and 757, 760, non-detecting sensor 110 may determine whether all frequencies or frequency bins in the frequency band have been analyzed, and act accordingly, in a manner detailed herein regarding steps 452, 454, 456, 461, 462, and 457, 460 of FIG. 4A.

A possible advantage of the example depicted with regard to FIG. 7A, is that in some example cases, neither of these sensors will have to send sample data. They may send only parameters. In such a case, a comparatively small amount of data is sent by both detecting sensor 105 in 728 and non-detecting sensor 110 in 750. Such communication will require data links of a comparatively narrower bandwidth, and similarly will require less processing power and buffering to achieve the communication. This may be one example of data reduction achievable using the methods of the presently disclosed subject matter.

Figure 7B:
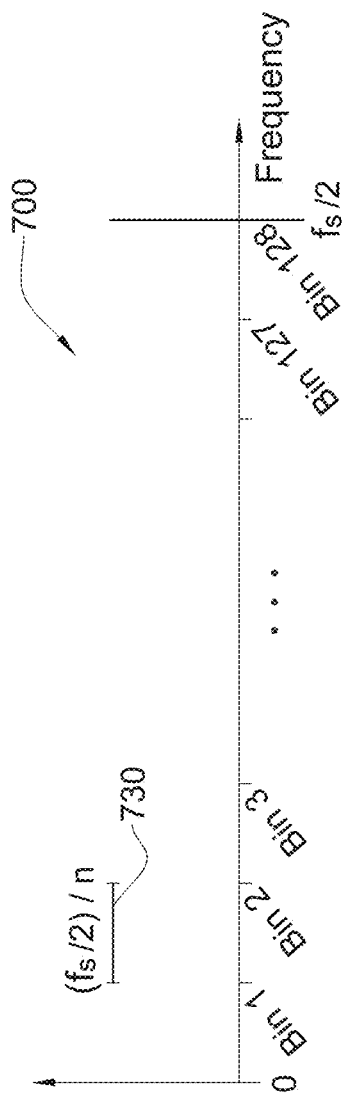
FIG. 7B illustrates generalized example representations of frequency bins, in accordance with certain embodiments of the presently disclosed subject matter.

Non-limiting exemplary methods of determining TOA will now be described. Turning first to FIG. 7B, a generalized exemplary representation of frequency bins is shown, according to some examples of the presently disclosed subject matter.

The non-limiting example disclosed herein will assume a sampling frequency $f_s$ equal to 1 Ghz, corresponding to a sample every Dt=1 nanosecond (ns). This may be for example the frequency of sampling by sampler 330. The receiver functionality 315, using for example signal processor 335, may process these samples separately in groups of, for example, n=128 samples each. In a case where signal processor 335 performs, for example, Fourier Transform or digital filtering on the samples, thus deriving processed samples in the frequency domain, the result may be data points in frequency bins. Example graph 700 shows such frequency bins. The number of bins produced by a filter may be equal to n (which is 128, in the example). The bandwidth of each frequency bin may be equal to $(f_s/2)/n$ (see reference 730). This may be the resolution of the frequency of a detected emitted signal. Therefore, references herein to emitter frequency may in some examples refer to emitter frequency bin. Note that the filtering may produce a data point in each bin, for each n-samples group in the time domain. In the example discussed herein, the frequency of the emitted signal may be in bin #2. Dt may be referred to herein as a data point spacing time interval.

Non-detecting sensor 110 may make use of at least several of the parameters received in step 728, to perform actions to filter out noise in the data indicative of the entire data of a frequency band received by sensor 110, thereby detecting the emitted signal. Examples of parameters, which may be utilized advantageously in this way may include the frequency bin of the emitted signal (e.g. bin #2 in graph 700), the pulse width PW, and the fact that a signal is repetitious and may have a PRI. In some examples, where the emitted signal is coherent, the non-detecting sensor may also make use of that fact. Examples of the use of these parameters will be elaborated on further herein.

Figure 8:
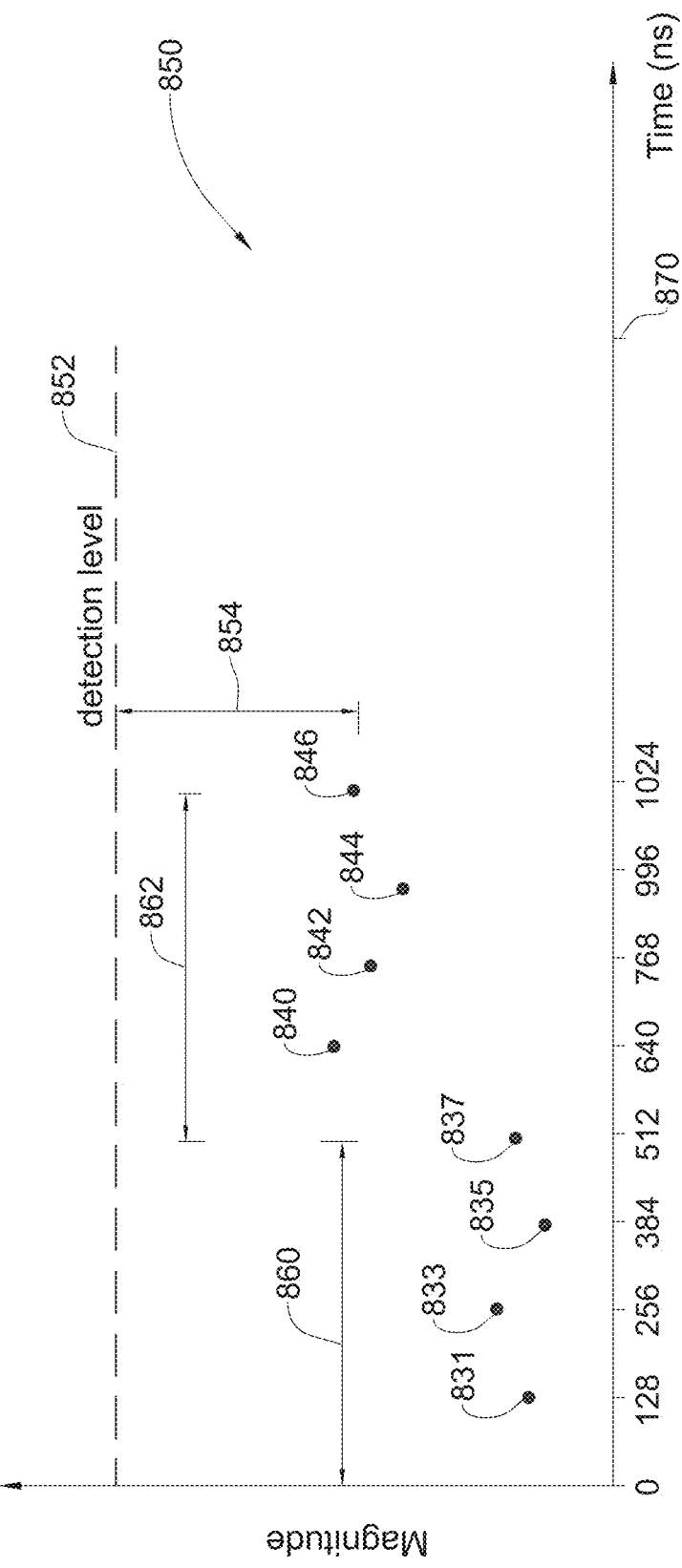
FIG. 8 illustrates a generalized example of arranging filtered data points, in accordance with certain embodiments of the presently disclosed subject matter.

Turning to FIG. 8, a generalized example of arranging filtered data points is presented, according to some examples of the presently disclosed subject matter. Taking the output of digital filtering, performed perhaps by signal processor 335, and arranging in the time domain the filtered results for only one frequency bin, for example bin #2 of FIG. 7B, a graph such as 850 may be derived. Example points 831, 833, 835, 837, all roughly of a certain magnitude, are plotted against the time axis, as are example points, 840, 842, 844, 846, all roughly of a certain larger magnitude. Note that the points are plotted at times 128, 256, 384 ns etc. This is because each point was derived from filtering performed of 128 time samples of 1 ns each, in the example disclosed herein. In, for example, the flow depicted in FIG. 7A, this may represent the output of signal processor 335 of non-detecting sensor 110, e.g. in step 711. These arranged data points may be used in further processing of the data. For example, in step 742, sensor 110 may have received parameters sent as assistance information by detecting sensor 105. This may in some cases include parameters such as pulse parameters set, in some cases sent in step 728, that include the frequency bin of the signal detected at 105. Sensor 110 may use this frequency bin information to analyze those data points in time that correspond to the frequency bin of the signal. Note that, by ignoring frequency bins for which 105 did not report signal detection, sensor 110 may be filtering out noise. However, in some cases, the magnitude of the data points may still be below the detection level 852, such that the signal has not been detected at sensor 110—despite the fact that these points correspond to the frequency of the emitted signal. The gap between the higher-power data points 840, 842, 844, 846 and the detection level is exemplified by 854. Points after time 1024 ns may exist, though they are not shown for clarity reasons.

Some techniques to further filter out noise, and possibly detect the signal, are now presented. These techniques may be performed, for example, by detecting and identifying processor 340 of the processor 320 of sensor 110, in some cases working together with other components such as, for example, controller processor 374.

Turning to FIG. 9A, a generalized example of a signal in the time domain is presented, according to some examples of the presently disclosed subject matter. The non-limiting example signal depicted in graph 905 is pulse 920. The pulse lasts roughly a time interval known as Pulse Width (PW). Note that there are points in time where there is a pulse, and others with no pulse. Though not shown, the same pulse may be emitted again by the emitter after a time known as the Pulse Repetition Interval from the start of pulse 920. Sensor 110 may have received the value PW in the assistance information in step 742. Non-detecting sensor 110 may take advantage of this information to assist it in a method to attempt to detect the signal, as will now be exemplified.

Considering graph 905, it may be understood that if sensor 110 performs a set of first integrations, on consecutive groups of data points in time, e.g. such as consecutive groups of the data points in graph 850, based on a first integration time interval $T_{first}$ that corresponds to a defined percentage of the Pulse Width, the result may be first data points. In some cases, first integration time interval $T_{first}$ may also be referred to herein as a first data point spacing time interval, as the first data points of an integration such that which results in graph 950 will be spaced by $T_{first}$.

Certain of such first data points may be derived from integration of data points that entirely or partly are times in which sensor 110 received an emitted signal (although the sensor may have not detected the signal above the noise). Such first data points would have comparatively high energy levels. On the other hand, others of the first data points may be derived from integration of data points in graph 850 that entirely are times in which sensor 110 did not receive an emitted signal. Since such other data points may contain only noise, their integration may yield first data points with comparatively low energy levels.

In choosing a value of first integration time interval $T_{first}$, sensor 110 may balance several considerations. On the one hand, a large value of this interval may result in integrating a larger number of points, yielding higher energy levels and a greater probability of detection. On the other hand, it should be considered that integration of data points which all, or nearly all, correspond to signal, would result in the highest possible energy values as compared to integration of data points that contain only noise. Therefore, choosing a large value of first integration time interval may cause integration of data points in graph 850, within one group, where some data points contain signal and some contain only noise. Such a choice would not yield the highest possible energy values. In some cases, first integration time intervals equal to values such as PW/3, PW/4, PW or even somewhat larger than PW, may provide acceptable results. The present exposition will continue with the non-limiting example first integration time interval value of PW/2, which may in many cases provide a good balance between the above considerations.

N will be defined here as the number of data points in time that yield a time interval equal to, or just below, the first integration time interval $T_{first}$. Each first integration will be performed on N data points. Since each first data point corresponds to n samples, $T_{first}=N*n*Dt=N*n/f_s$. In the example case where $T_{first}=PW/2$, this gives $N=\text{floor}((PW/2)/(n*Dt))$ Reverting to FIG. 8, the example case shown is of PW=1024, and first integration time interval $T_{first}$ equal to PW/2=512 ns. In this case, we get N=512 ns/(1 ns*128 samples)=4 data points. Thus, the first integrations are performed in this case separately on consecutive groups of four points. The first integration may be performed first on points 831, 833, 835, 837, spaced 128 ns apart and thus covering a first integration time interval of 512 ns=PW/2. The first integration may be performed next on points 840, 842, 844, 846, also spaced 128 ns apart and thus also covering a first integration time interval of 512 ns. Such a first integration may be performed in this case also for some or all of the consecutive groups of four points, covering some or all of the data points for frequency bin #2 that were output by signal processor 335.

Non-limiting example filtering techniques for performing the first integrations include Fourier Transform, Fast Fourier Transform, Discrete Fourier Transform and a Finite Impulse Response (FIR). These are known in the art. In some cases, such integrations may yield a gain of N. Other filtering techniques known in the art may be used.

Note that the non-limiting numeric examples above are presented only for ease of exposition and of display on the graphs. In some cases, values of N larger than 4 may be expected to enable improved filtering results.

It may be said that detecting and identifying processor 340 of sensor 110 is performing first integrations, of the data indicative of the entire data of a frequency band received by the sensor during the defined time interval (e.g. dwell N), based on a first integration time interval and on the frequency bin corresponding to the emitter frequency, and that these first integrations create first data points. The first integration time interval corresponds to a defined percentage of the Pulse Width.

It should also be noted, that in some example cases, prior to performing the set of first integrations, detecting and identifying processor 340 of sensor 110 may multiply the data indicative of the entire data of the frequency band received by it, by a window. Examples of suitable windows are Hamming, Chebyshev, or other windows known in the art. In some cases, the data indicative of the entire data of the frequency band may be the processed samples generated by signal processor 335.

Turning to FIG. 9B, a generalized example of arranging filtered data points is presented, according to some examples of the presently disclosed subject matter. Graph 910 presents an example of such first data points. First data point 982, positioned at 512 ns, is the result of the first integration of the four points 831, 833, 835, 837, which ranged from 0 to 512 ns. First data point 984, positioned at 1024 ns, is the result of the first integration of the four points 840, 842, 844, 846, which ranged from 512 to 1024 ns. First data points 986, 988, 989 are the results of the first integration of three consecutive groups of four points that are not shown in graph 850. Graph 850 has, in the example presented, N times as many points as does graph 910, in the example four times as many, while the time intervals of points graph 910 are thus four times that of those in graph 850.

The integration has also caused the magnitudes of the points of graph 910 to be larger than that of those in graph 850. The processing gain for this integration may in some examples be N. Comparing FIGS. 9A and 9B, it can be seen that first data point 982 positioned at 512 ns is the result of integration of data points that contain region 922, containing ¼ of the pulse, as well as data points for times before 922 that contain no signal. Similarly, first data point 986 positioned at 1536 ns is the result of integration of data points that contain region 920, containing ¼ of the pulse, as well as data points for times after 922 that contain no signal. These two first data points are thus shown with magnitude values of approximately "5". By comparison, first data point 984 positioned at 1024 ns is the result of integration of data points that contain region 924, containing ½ of the pulse, and contain only data that is indicative of the pulse. The region 924 contains no data points that contain no signal, and no data points that contain only noise. This data point is thus shown with a magnitude value of approximately "10", larger than "5". It can thus be seen that integrating N groups, such that integration on some of the groups may be on only data points that contain emitted signals, may increase the energy of the first data points, thus bringing the signal closer to possible detection. Considering first data points 988, 989, corresponding to times 2048 and 2560 ns during which there was no signal pulse in 905, it may be seen that they were derived from the integration of noise-only data points. 988 and 989 thus have comparatively a very low magnitude, exemplified in graph 910 as "0.1". Again, other points after time 2560 ns are not shown, for clarity.

At this stage, sensor 110 may determine whether the first data points include data indicative of at least one emitted signal received by it. In some example cases, this first integration may be sufficient to raise at least one first data point above the detection level 960, thus enabling detection by non-detecting sensor 110 of the emitted signal 142. In such a case, the sensor 110 will determine that the first data points comprise data indicative the emitted signal received at sensor 110. This may be referred to as an assisted detection. In other example cases, even a high-energy first data point such as 984 may still be below the detection level 960, as exemplified by the gap 987. In such cases, sensor 110 may perform additional actions to detect the signal, for example as presented further herein.

It should be again noted, that all the numbers presented here are only examples for exposition. Similarly, graph 905 shows a pulse occurring over a period of time, such that exactly ¼ of it falls in each of two first data integrations and ½ of it falls in another first data integration. This of course is only presented as an example, since in other example cases the time alignments between pulse and first integration groups may not be as shown.

As indicated above, in some example cases, sensor 110 may determine that the first data points do not comprise the data indicative of the emitted signal of which sensor 105 reported in 728. In response to such a determination, sensor 110 may perform additional actions to detect the signal, making use of the assistance data. It may, for example perform additional filtering on the data of graph 910 of FIG. 9B to boost the signal levels to possibly above the detection level. In some examples, this additional filtering may be based on the PRI parameter. As a non-limiting example, the emitter may work at a 10% duty cycle. Given the example value of PW=1024 ns, PRI may be in such a case be 10,240 ns. Also, in this example, the number of signal pulses sent by the emitter during the current dwell is 100 pulses.

Turning to FIG. 10, a generalized example of arranging filtered data points is presented, according to some examples of the presently disclosed subject matter. FIG. 10 may show a conceptual rearrangement of the first data points in graph 910, a rearrangement which may be useful for performing additional filtering. For example, graph 1000 of FIG. 10A shows point 1006, identical to point 982, positioned at 512 ns. The next first data point on graph 1000 is 1008, which corresponds to time 512+the value of the PRI for the signal. This first data point 1008 appears in 910, far to the right of point 989, but is not shown in graph 910, for clarity reasons. Next shown in 1000 is the first data point 1012, which corresponds to time 512 ns+2 times the value of the PRI. This may be continued, for time 512 ns+3*PRI and so on, until the final first data point on graph 1000, point 1014, corresponding to 512 ns+(M−1) times the value of PRI. M−1 is the number of second integration time intervals, a term which will be explained further herein. There are M first data points in each graph of FIG. 10. For convenience, each first data points point on each graph can be referred to as point m, where m=1 to M.

In some cases, M may be equal to the number of signal pulses sent by the emitter during the current dwell. Note that the points between 2*PRI and (M−1)*PRI are not shown in 1000, nor in 910, for clarity.

Figure 10A:
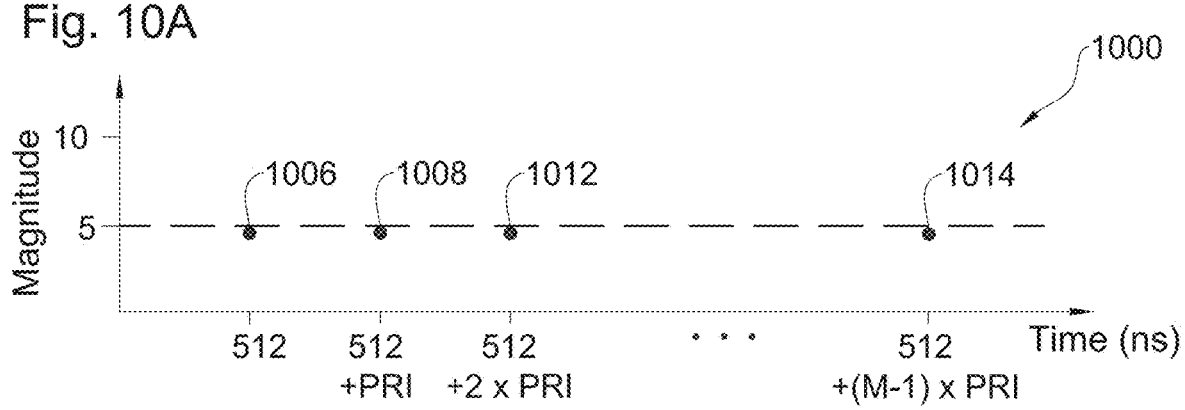
FIGS. 10A to 10B illustrate a generalized example of arranging filtered data points, in accordance with certain embodiments of the presently disclosed subject matter.
Figure 10B:
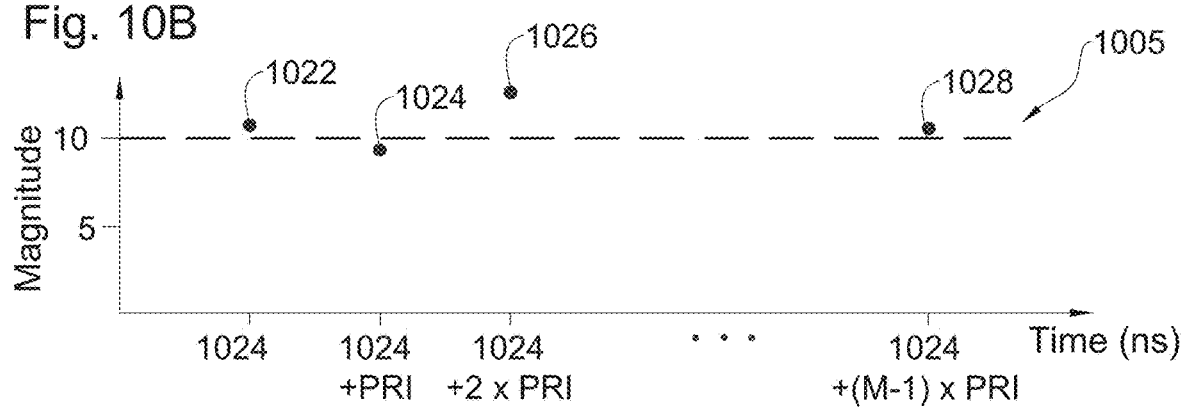
Figure 10C:
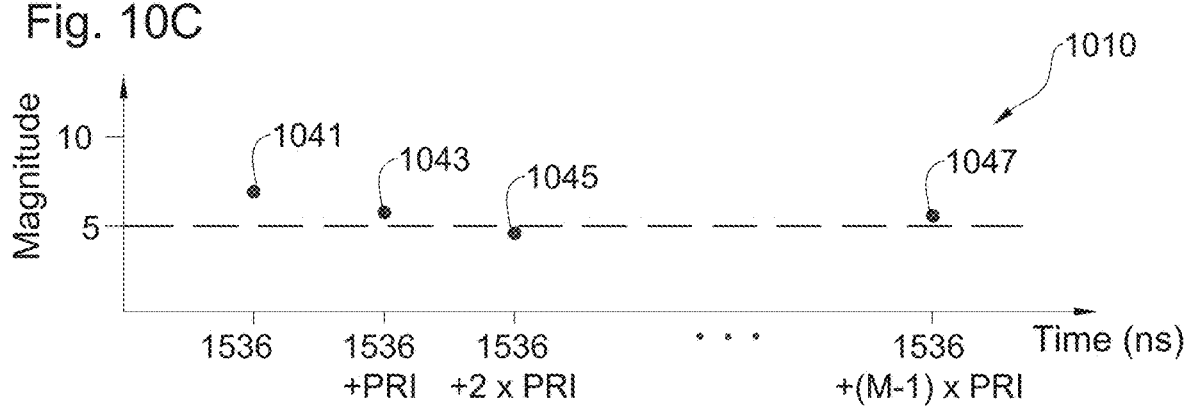
Figure 10D:
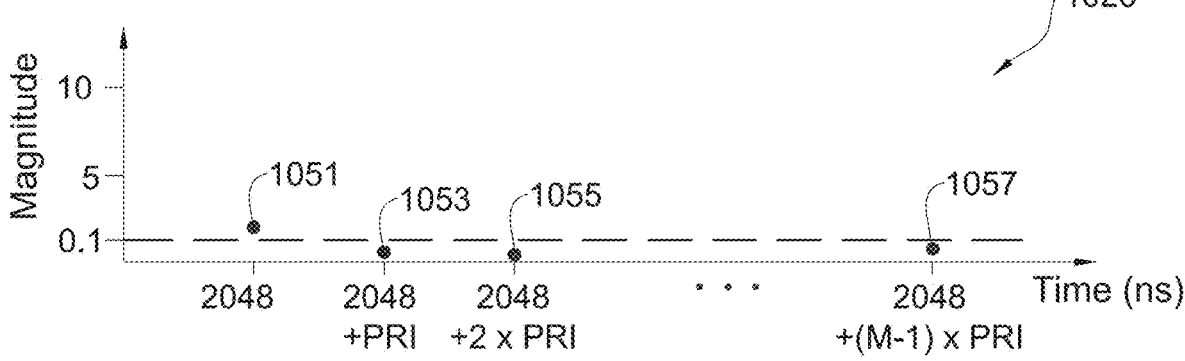

Similarly, FIG. 10B shows an example arrangement 1005, of first data points from 910, arranged by the interval of PRI, in a manner similar to that of 1000, but this time starting with first data point 1022 corresponding to first data point 984, positioned at 1024 ns. FIG. 10C shows a similar example arrangement 1010, of first data points from 910, but this time starting with first data point 1041 corresponding to first data point 986. FIG. 10D shows a similar example arrangement 1020, of first data points from 910, but this time starting with first data point 1051 corresponding to first data point 988. Similar graphs may be created for all first data points in 910 up to the time equal to PRI, in the example case equal to 10,240 nanoseconds. In this manner, all first data points on 910 may be rearranged based on the PRI value, in this example.

Considering FIG. 10, it can be seen that each graph may correspond to an example arrangement of first data points from 910, arranged by a second defined interval, referred herein to as second integration time interval. In the example of FIG. 10, this second integration time interval may be the PRI. In this example, K may be defined as the number of first integration time intervals that are equal to, or nearly equal to, one second integration time interval:

$K=\text{floor}(\text{second integration time interval}/\text{first integration time interval})$ One second integration time interval would comprise K first integration time intervals, but no more. For the example numbers presented here, K may be the number of PW/2 intervals that fit into one PRI. For convenience, the first data points that fit into one PRI may be referred to herein as points k=1 to K. Recall that M−1 is the number of second integration time intervals. M is equal to the number of points to be integrated in each second integration. In some cases, M may be equal to the number of signal pulses sent by the emitter during the current dwell. Thus, the total number of first data points across all of the second integration time intervals may be K*M. It may thus also be seen that FIG. 10A contains all the first data points for which k=1, FIG. 10B contains all the first data points for which k=2, FIG. 10C contains all the first data points for which k=3, and so on. A graph not shown in FIG. 10 would show all first data points for which k=K.

In the case shown in FIG. 10, each point on a particular graph corresponds to the same portion of the repeated pulse. For example, all of the points in graph 1000 correspond to the first, partial, portion of the pulse 920, as depicted in graph 905 as region 922 corresponding to 512 ns and its repetitions. This may be the case if the spacing used in the rearrangement is exactly equal to the PRI. Thus all of the points 1006, 1008, 1012, 1014 are in the vicinity of magnitude "5". Similarly, all of the points in graph 1005 correspond to the second, full, portion of the pulse, containing all signal, as depicted in graph 905 as region 924 corresponding to 1024 ns and its repetitions. Thus all of the points 1022, 1024, 1026, 1028 are in the vicinity of magnitude "10". Recall from the discussion of FIG. 9 that this relatively high magnitude may be due to the fact that in some cases these points may all be points that contain signals. Similar comparisons can be made between graph 1010, region 926, and the approximate magnitude "5". Similar comparisons can be made between graph 1020 and the region of graph 910 corresponding to 2048 ns, in which there is no signal and only noise, and the approximate magnitude is "0.1".

Taking FIG. 10 as the basis for understanding a possible process, an example process for filtering to increase signal SNR is now described. Non-detecting sensor 110 may perform a set of second integrations, of data indicative of the first data points (exemplified in graph 910), based on a second integration time interval $T_{second}$ that corresponds to the Pulse Repetition Interval. The example shown in the figures uses PRI as the value of the second integration time interval $T_{second}$.

Each set of second integrations may be done on a second group, of first data points, such that at least two conditions are fulfilled:

(1) Each second group starts with a "starting point", which is a unique one of the first data points represented by graph 910 that range between 0 ns (representing the beginning of the first data points) and a time equal to the second integration time interval (equal to PRI, in the example case presented here). Recall from the discussion above that there are K such starting points, with relative positions k=1 to K.

(2) Each second group includes all, or some, of the first data points represented by graph 910 that are spaced an integral number of second integration time intervals from each other. In some examples, there may be M such first data points in each group. In in the example case presented here, these points in each group will be spaced a PRI from each other.

Non-limiting example filtering techniques for performing these second integrations include Fourier Transform, Fast Fourier Transform and Discrete Fourier Transform. These are known in the art. In some cases, such integrations may yield a total gain of N*M for the first and second integrations. Other filtering techniques known in the art may be used.

A difference between the first and second integrations should be noted, in some example cases. The first integrations are performed on consecutive groups of data points, where each first integration is performed on a group that is composed of N consecutive data points, which cover a time approximately equal to a first integration time interval. By contrast, the second integrations are performed on second groups, where each second group is composed of points that are NOT consecutive, but rather are spaced from each other by a second integration time interval. The second integration may be based on non-consecutive first data points. The starting points of each second integration may be consecutive. There are up to K such starting points. Thus, in some examples, the first integration time interval may be an interval of consecutive points which are integrated, while the second integration time interval may be the interval at which the various first data points to be integrated are spaced, the interval between points that are sampled for the second integration.

Note that the rearrangement of FIG. 10 can in some examples be done by a value of second integration time interval $T_{second}$ other than the PRI. The rearrangement may be by a different value, that corresponds to, or is close to, the PRI value (smaller or larger than PRI). For example, the second integration time interval could be 2*PRI.

Note also that the preceding is only one non-limiting example implementation. The second integrations may in some cases be performed with respect to all K starting points. In some cases, the second integrations may be performed with respect to only some of them. Performing all K second integrations may in some cases improve the probability of signal detection. The second integrations may in some cases be performed with respect to M equal to all pulses emitted by the emitter, while in some cases it may not be performed with respect to all emitted pulses.

Figure 11:
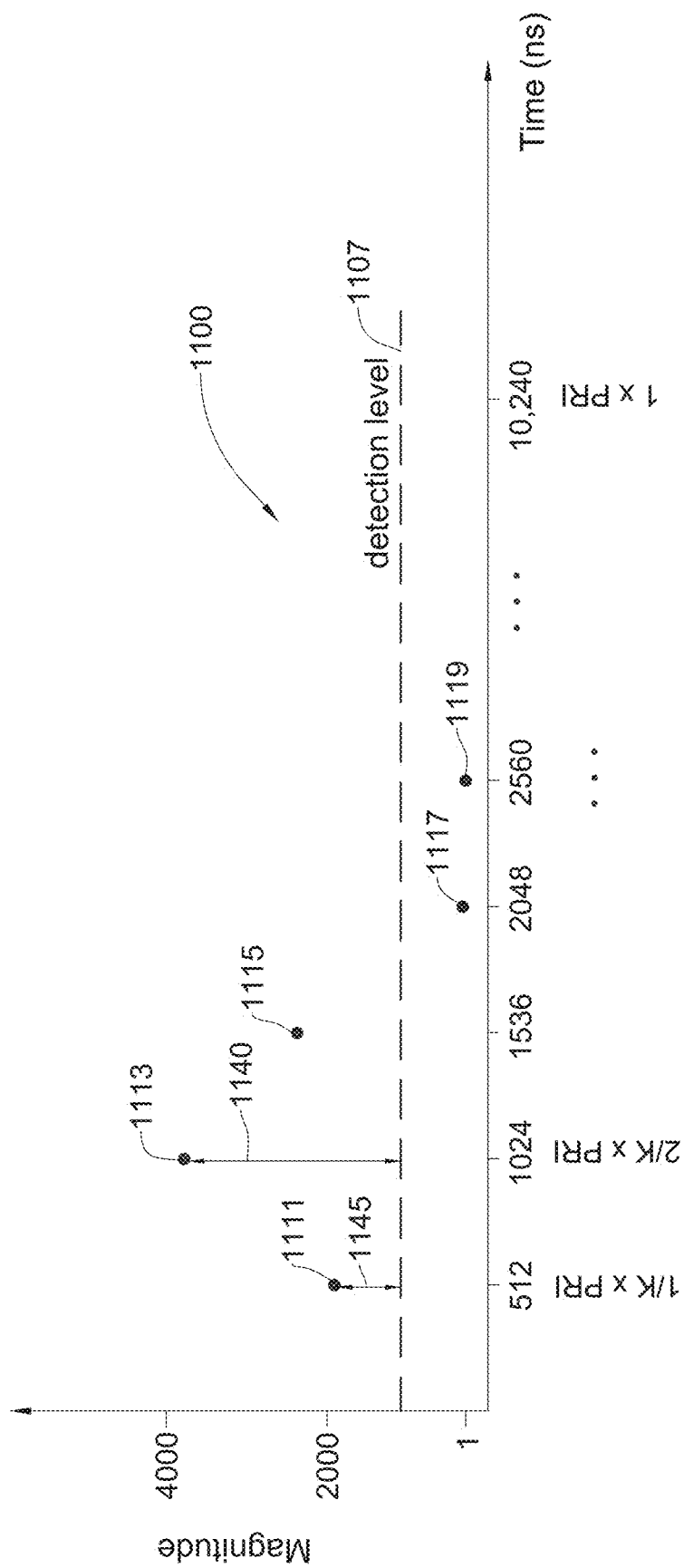
FIG. 11 illustrates a generalized example of second data points, in accordance with certain embodiments of the presently disclosed subject matter.

Turning to FIG. 11, a generalized example of second data points is presented, according to some examples of the presently disclosed subject matter. FIG. 11 may show a result of such a set of second integrations, performed with respect to first data points of FIG. 10. Graph 1100 shows only data for frequency bin #2, in which the emitted signal was detected by detecting sensor 105. In the example, second data point 1111 is the result of a second integration performed on the second group consisting of first data points of graph 1000, starting at 512 ns and counting in steps of PRI. Similarly, second data point 1113 is the result of a second integration performed on the second group consisting of first data points of graph 1005, starting at 1024 ns and counting in steps of PRI. Second data point 1115 corresponds to graph 1010, and starting point 1536 ns; while Second data point 1117 corresponds to graph 1020, and starting point 2048 ns. In the example of graph 1100, the second integration time interval is equal to PRI, M is equal to the number of pulses (which in the example is 100 pulses), and second integrations were done over all M−1 second integration time intervals. Recalling the earlier definition of K, time 512 ns in this example is 1/K*the PRI, 1024 ns=2/K*PRI, while the time 10,240 ns of the last point is =K/K*PRI, equals one full PRI.

Thus, in some example cases, detecting and identifying processor 340 of the non-detecting sensor 110 may have performed a second integration, of data indicative of the first data points, based on a second integration time interval, and on the at least one frequency bin corresponding to the at least one emitter frequency, thereby creating second data points, where the second integration time interval corresponds to the Pulse Repetition Interval. This was done to determine a Time of Arrival value of the emitted signal at the non-detecting sensor.

The result of such second integrations may be to further boost the SNR of the signal. This may give, in some examples, a total N*M as compared to the original processed samples—where N is the number of data points per group used in the first integration, and M−1 is the total number of second integration time intervals. Graph 1100 exemplifies results for an example of 100 pulses, and integration on all pulses. In this case, M=100. A case in which the second integrations were performed on data of all pulses would increase this gain. In the graph 1100, second data point 1113 has a magnitude close to 1000, M=100 times the magnitude in graph 1005. A similar example gain can be seen for second data points 1111 and 1115, with magnitudes of roughly 500, as compared to the magnitudes in graphs 1000 and 1010. These second data points in some cases may now also above the detection level 1107. On example of the gap is shown in 1145.

Next, the maximum power would be determined. In the example of graph 1100, this would be second data point 1113. The time 1024 ns corresponding to 1113 may thus be determined to be the TOA of the first pulse, within a certain resolution. This approximate TOA calculation may be TOA=k*N*n/$f_s$, where k=1 to K is the relative position of the TOA with respect to the PRI, with K as defined above, and $f_s$ is the sampling frequency of e.g. sampler 330. Note that in the non-limiting example of graph 1100, k=2 gives the maximum power.

In such cases, detecting and identifying processor 340 may have determined that the second data points comprise the data indicative of the emitted signal received by non-detecting sensor 110, and thus the pulse has been detected.

In this example, the first pulse has been determined to occur somewhere between approximately between 512 ns and 1024 ns. The PW may be used to determine the approximate time boundaries of the pulse. TOA of the first pulse may thus have been determined. It may be said, in such a case, that the non-detecting sensor used the assistance information to perform an assisted detection. Also, other pulses may be known to start at integer PRI intervals from the TOA of the first pulse, and end at the M-th pulse. Thus, in some cases all pulses may have been detected, and more than one TOA may have been determined.

Note also that the second data points 1117, 1119 etc. in this example, derived from processed samples corresponding only to sample times with noise only and no signal, still have relatively low magnitudes, below the detection level 1107—and thus such second data points clearly do not represent times of signal pulses.

It should be noted, that if the emitted signal is a coherent one, the first and second integrations may raise the energy level, and increase the SNR, of the relevant data points, more than in a non-coherent case—and thus in some cases such integrations may have a higher probability of enabling detection in the case of a coherent signal.

In some example cases, the first integrations may be performed on all frequency bins of the integration previous to it. Similarly, in some example cases, the second integrations may be performed on all frequency bins of the integration previous to it. In other example cases, depending on the resolution of bandwidth of the emitted frequency which the detecting sensor send in step 728 as part of the parameters of the assistance information, the method may be more selective as to which frequency bins should be integrated in either or both of the first and second integrations.

It should also be noted, that in the above examples the first integrations are performed on processed samples that in some cases may be derived by signal processor 335, by for example performing digital filtering on samples received from sampler 330. In these examples, N is equal to 4 data points, each spaced 128 ns apart, and the N points encompass a first integration time interval of 512 ns. However, in other examples, non-detecting sensor 110, e.g. utilizing its detecting and identifying processor 340, may instead perform the first integrations on the samples received from sampler 330. For the example values presented herein, these first integrations would be on consecutive groups of 4×128=512 points, each spaced 1 ns apart. N in such a case is equal to 512, rather than 4. Note that the first integration time interval remains 512 ns. In such cases, the samples received from sampler 330 may constitute the data indicative of the entire data of a frequency band received by the at least one non-detecting sensor during the corresponding defined time interval, on which the first integrations are performed.

It should also be noted, that an example case was presented, of performing first integrations, and then performing second integrations only if the first integrations did not result in signal detection. It is envisioned that in other example cases, second integrations corresponding to, for example, PRI may be performed first, directly on the data points of the processed samples. In such a case, only if the second integrations did not result in detections, first integrations corresponding to, for example, PW may be performed.

In some examples, if a more accurate TOA is desired than is obtainable using the above methods for the particular application and system architecture 100, additional steps may be performed, to provide in some cases a more accurate TOA. Now that the TOA of each detected pulse is known, within a certain resolution, the first and second sets of integrations may be performed again on, for example, the processed samples obtained from signal processor 335. However, in this example repetitions of the above integrations, three changes may be incorporated in the first integrations.

First, the first integration time interval may be set equal to PW, rather than for example a value such as PW/2 or PW/3 used to determine the rough TOA value(s). That is, the first integrations may be performed on something close to 2*N data points. This may improve the resulting SNR. In some cases, the first integration time interval may be set to another value close to the PW but not equal to it.

Second, rather than performing first integrations on distinct consecutive groups of N data points, a first integration may be performed on partially overlapping groups. That is, in some examples a first integration will be performed on a particular data point X and the 2*N data points following it, another first integration will be performed on data point X+1 (adjacent to data point X) and the 2*N data points following it, and so on, until the data point that is positioned 2*N data points before the end of the third defined time interval (described below). Note that in some example cases, such an approach could have been taken also to find the initial values of TOA, but it may be considerably less efficient than the example method disclosed with respect to FIGS. 8 to 11.

Third, once the TOA or TOAs are known, the need to integrate data points corresponding to the possibly long periods of time in which no signal was emitted may in some examples be obviated. For example, given a 10% duty cycle, 90% of the data points may contain no signal. By skipping these points, this process can be done more efficiently. Thus, the integrations can be performed only with respect to that portion of the data which corresponds to a time that is within a second time interval before the Time of Arrival of each detected pulse (which was calculated for sensor 110), and a third time interval after this Time of Arrival. This may be especially advantageous, where 2*N data points are being integrated, in respect of each data point within the second and third time intervals. In one non-limiting example, the second and third time intervals could both be 2*PW. The data points within these intervals around each pulse TOA would constitute data indicative of an entire data of the frequency band received by the non-detecting sensor during the defined time interval.

First integrations performed using the above variations may be referred to herein as modified first integrations. Their output first data points may be referred to as modified first data points. The updated TOA value(s) may be referred to as second Time(s) of Arrival.

Using such a method, the TOA(s) of the pulse may in some cases be derived with greater accuracy, possibly due to the finer resolution of the single-point moving of groups of points and the improved SNR.

Figure 12A:
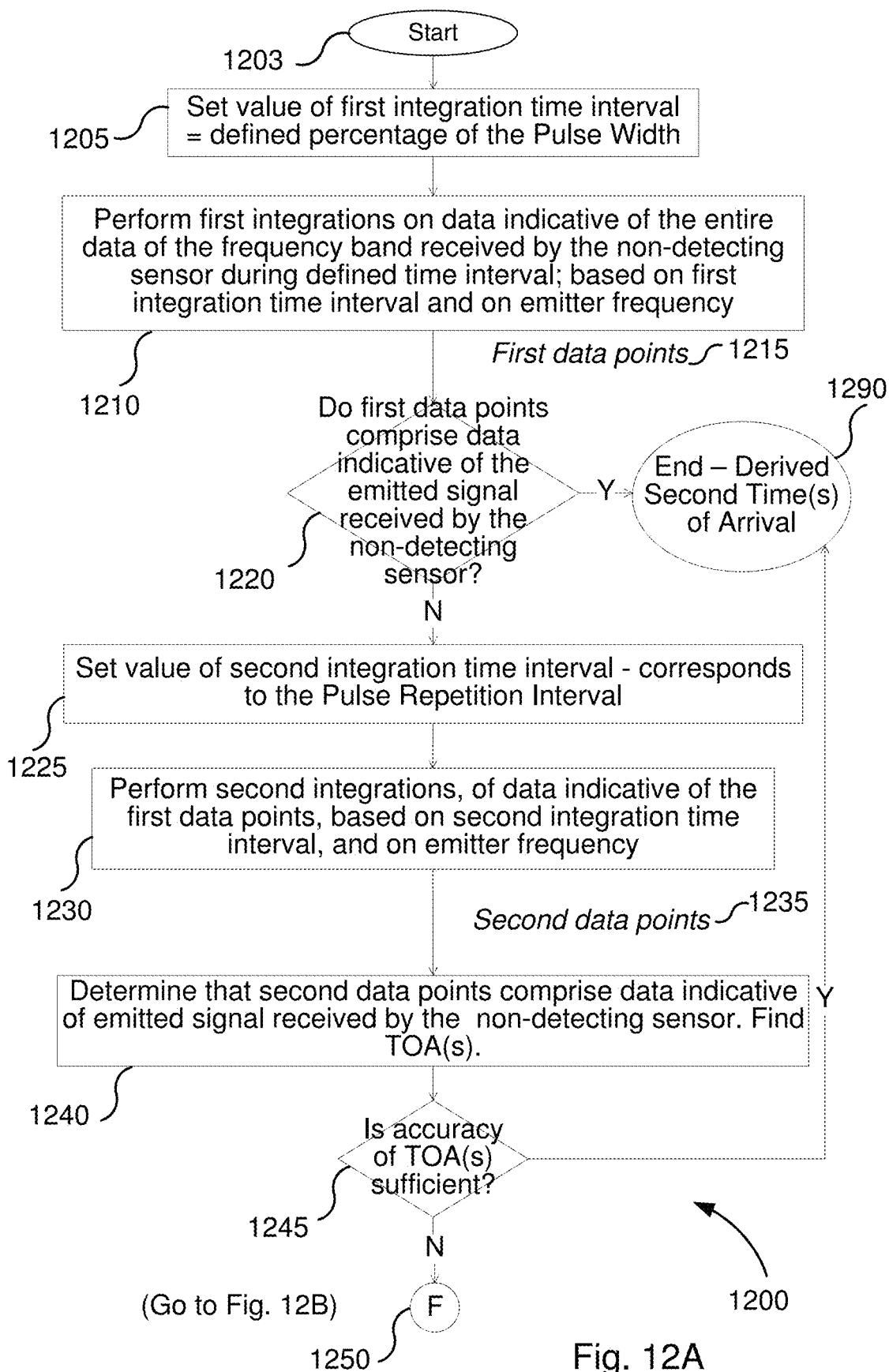
FIGS. 12A to 12B illustrate a flowchart of a generalized example sequence of operations carried out to determine Time(s) of Arrival, in accordance with certain embodiments of the presently disclosed subject matter.
Figure 12B:
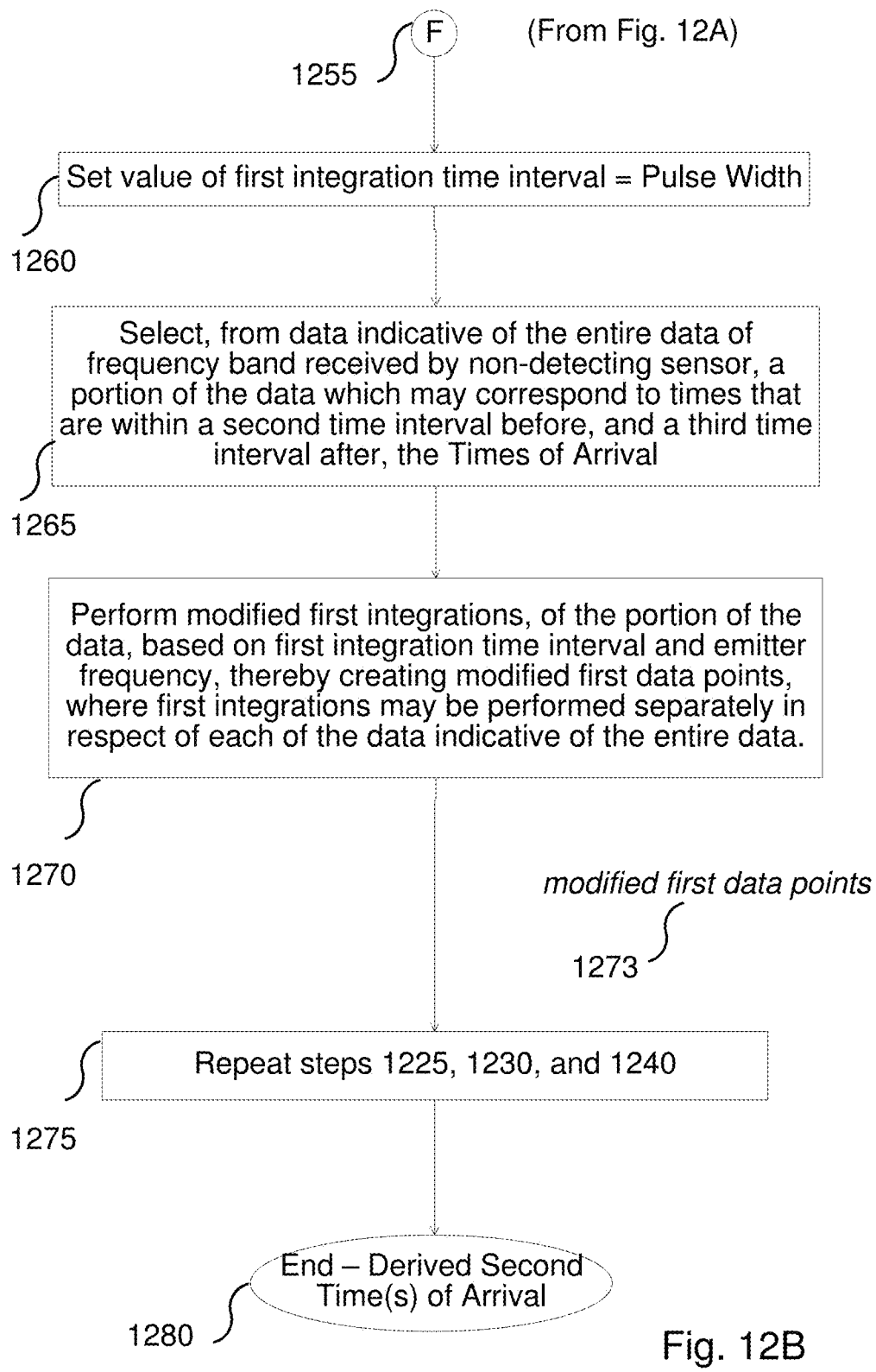

Turning to FIGS. 12A and 12B, there is illustrated one example of a generalized flow chart diagram 1200 of determining TOA(s), in accordance with certain embodiments of the presently disclosed subject matter. The method described with regard to FIG. 12 may in some examples cases be a specific implementation of step 746 in FIG. 7A. The methods exemplified in FIG. 12 may in some example cases make use of the methods elaborated herein with respect to FIGS. 7B through 11. In some example cases the steps may be performed by detecting and identifying processor 340 of a non-detecting sensor 110.

Turning first to FIG. 12A, the process may start at 1203. In step 1205, the value of the first integration time interval may be set to a defined percentage of the Pulse Width. The pulse width may have been reported as a parameter by e.g. detecting sensor 105, for example in step 728. In step 1210, first integrations may be performed on data indicative of the entire data of the frequency band received by the non-detecting sensor during the defined time interval. These integrations may be based on the first integration time interval and on emitter frequency. For example, the integrations may be based on the frequency bin corresponding to the emitter frequency. The output of the first integrations may be first data points 1215.

In step 1220, a determination may be made, whether the first data points comprise data indicative of the emitted signal received by the non-detecting sensor. In response to the determination being Yes, the TOAs may be derived, for example as elaborated further herein, and the process may end 1290.

In response to the determination being No, in step 1225 the value of the second integration time interval may be set, to correspond to the Pulse Repetition Interval. The PRI value may have been reported as a parameter by e.g. detecting sensor 105, for example in step 728. In step 1230, there may be performed second integrations, of data indicative of the first data points, based on the second integration time interval, and on the emitter frequency. The output of the second integrations may be second data points 1235.

In step 1240, a determination may be made that the second data points comprise data indicative of emitted signal received by the non-detecting sensor. TOAs may be derived, for example as elaborated further herein.

In step 1245, a determination may be made whether the accuracy of the calculated TOA(s) is sufficient for the needs of the particular application.

In response to the determination being Yes, the process may end 1290. The updated TOA value(s) may be referred to as second Time(s) of Arrival.

In response to the determination being No, flow may continue (1250, 1255, F) to FIG. 12B. In step 1260, the value of the first integration time interval may be set in some examples to the Pulse Width, or in some examples to a value close to the Pulse Width.

In step 1265, the detecting and identifying processor 340 may select, from data indicative of the entire data of the frequency band received by non-detecting sensor, a portion of the data which corresponds to times that are within a second time interval before, and a third time interval after, the Times of Arrival.

In step 1270, the detecting and identifying processor 340 may perform modified first integrations, of the portion of the data, based on the first integration time interval and the emitter frequency. These first integrations may be performed separately in respect of each of the data indicative of the entire data. This process may create modified first data points 1273.

In step 1275, steps 1225, 1230 and 1240 may be performed, where the modified first data points are considered first data points in step 1230. The updated values of TOA may be determined, possibly more accurate than those determined earlier in the flow.

This process may end at 1280. The updated TOA value(s) may be referred to as second Time(s) of Arrival.

It should be noted here, that the above example cases all disclose a detecting sensor sending assistance information to a non-detecting sensor, and that in some cases they may use other systems as a relay. However, in other example cases, the detecting sensor 105 may instead send the assistance information to one or more system centers 140. The assistance information may in some examples be one or more of those described with regard to the various flow chart Figures. The system center may be configured to receive such assistance information from one or more detecting sensors 105, 115. It may analyze and process this data. In some cases the system center 140 may compare data received from multiple detecting sensors, for example determining which of them detected the signal at the highest SNR. The system center may have configuration data regarding the system regarding the specific application task to be performed. In some cases, based on the analysis of the assistance information, and on configuration data, the system center may send second assistance information to the non-detecting sensor 110.

In some cases, the second assistance information and the first assistance information may be the same. In some cases, the second assistance information may be one or more of those described with regard to the various flow chart Figures, which is not identical to the first assistance information that the system center received from one or from any of the detecting sensors. For example, the assistance information may include a certain amount of data indicative of data received by the detecting sensor(s), sent in some cases because the detecting sensor(s) did not have the processing capacity to determine parameters based on the data. The system center, possessing in some cases greater processing capacity, may be able to derive the parameters and send those as the second assistance information. In another example, the system center may extract from the assistance information only a sub-set of the data, and send that reduced subset as the second assistance information to the non-detecting sensor 110.

An example advantage of such an implementation is that the system center 140 may have more processing and storage capacity than any or all of the detecting sensors 105, 115. Another example advantage of such an implementation is that the system center 140 may have access to updated or additional data from sources external to the system. The system center may thus, in some cases, be able to make a more application-appropriate decision what is the best assistance information that should be sent to non-detecting sensors such as 110. Also, as indicated above, in some cases this decision may lead to the sending of a smaller amount of data to the non-detecting sensor 110, compared to the amount of data sent by detecting sensor 105 to system sensor 140.

In some embodiments, one or more steps of the various flowcharts exemplified herein may be performed automatically. The flow and functions illustrated in the various flow chart figures may for example be implemented in processing circuitry 350, and may make use of components described with regard to FIGS. 3A and 3B.

It is noted that the teachings of the presently disclosed subject matter are not bound by the flow charts illustrated in the various figures. The operations can occur out of the illustrated order. For example, it was noted that operations 421 and 430 shown in succession can be executed substantially concurrently or in the reverse order. This applies also, for example, to steps 424 and 432, 425 and 433, among others. Similarly, some of the operations or steps can be integrated into a consolidated operation or can be broken down to several operations, and/or other operations may be added. It is also noted that whilst the flow chart is described with reference to system elements that realize them, such as for example processing circuitry 350, this is by no means binding, and the operations can be performed by elements other than those described herein.

In embodiments of the presently disclosed subject matter, fewer, more and/or different stages than those shown in the figures can be executed. In embodiments of the presently disclosed subject matter one or more stages illustrated in the figures can be executed in a different order and/or one or more groups of stages may be executed simultaneously.

In the claims that follow, alphanumeric characters and Roman numerals used to designate claim elements are provided for convenience only, and do not imply any particular order of performing the elements.

It should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter or any part thereof. The presently disclosed subject matter further contemplates a non-transitory machine-readable or computer-readable memory tangibly embodying a program of instructions executable by the machine or computer for executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system capable of communicating information concerning a received signal, comprising: a sensor, the sensor comprising a processing circuitry and configured to:
   (a) responsive to receiving by at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor,
      send from the at least one detecting sensor assistance information corresponding to the at least one emitted signal detected by the at least one detecting sensor during the defined time interval, to at least one non-detecting sensor, wherein the assistance information is capable of being utilized by the at least one non-detecting sensor to perform an action with respect to data indicative of an entire data of a frequency band received by the at least one non-detecting sensor during a corresponding defined time interval, the action corresponding to the at least one emitted signal received by the at least one non-detecting sensor during the corresponding defined time interval.

2. The system of claim 1, wherein the assistance information does not comprise the entire data of the frequency band received by the at least one detecting sensor during the defined time interval.

3. The system of claim 1, wherein the assistance information comprises at least one instruction for saving of data received by the at least one non-detecting sensor during the corresponding defined time interval, indicative of the at least one emitted signal detected by the at least one detecting sensor during the defined time interval, and
   wherein performing the action comprises: said saving of data, and sending at least a portion of the saved data to a system center when communication to the system center is available.

4. The system of claim 1, wherein performing the action comprises extracting, from the data indicative of the entire data of a frequency band received by the at least one non-detecting sensor during the corresponding defined time interval, data indicative of the at least one emitted signal received by the at least one non-detecting sensor during the corresponding defined time interval.

5. The system of claim 4, wherein the assistance information comprises data indicative of an entire received data sample at the at least one detecting sensor corresponding to the at least one emitted signal detected by the at least one detecting sensor.

6. The system of claim 5, wherein the data indicative of the entire received data sample comprises data indicative of an entire received data sample at the at least one detecting sensor corresponding to at least one frequency of the at least one detected emitted signal.

7. The system of claim 5, wherein the data indicative of the entire received data sample comprises data indicative of an entire received data sample at the at least one detecting sensor corresponding to sample times of the at least one detected emitted signal.

8. The system of claim 1, wherein a required communication bandwidth for the assistance information is substantially smaller than a communication bandwidth required when sending the entire data of a frequency band received by the at least one detecting sensor during the defined time interval.

9. The system of claim 4, wherein the assistance information comprises at least one set of parameter values corresponding to the least one detected emitted signal, wherein said extracting data indicative of at the least one emitted signal comprises determining at least a Time of Arrival (TOA) value of the at least one emitted signal at the at least one non-detecting sensor, said at least the Time of Arrival of the at least one emitted signal constituting data indicative of at least one emitted signal received by the at least one non-detecting sensor during the corresponding defined time interval.

10. The system of claim 1, wherein the sending of the assistance information from the at least one detecting sensor comprises at least one of: sending directly from the detecting sensor to the non-detecting sensor, relaying via at least one other sensor, and relaying via at least one system center.

11. The system of claim 1, wherein at least one of the following is met:
   i) the at least one detecting sensor and at least one non-detecting sensor are comprised in at least one of an airborne vehicle, a balloon, a space-borne vehicle, a ground station, a ground vehicle, and a water-borne vehicle;

ii) the at least one system center is comprised in at least one of airborne vehicle, a balloon, a space-borne vehicle, a ground station, a ground vehicle, and a water-borne vehicle;

iii) the at least one emitter is one of a radio transmitter equipment, a radar, and a communication system.

12. The system of claim 1, wherein said step (a) is further performed for at least a next defined time interval.

13. A system capable of performing an action associated with a received signal, comprising: a sensor, the sensor comprising a processing circuitry and configured to:
(a) receive by at least one non-detecting sensor, an assistance information from at least one detecting sensor, wherein the assistance information was sent by the at least one detecting sensor, responsive to receiving by the at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor,
wherein the assistance information corresponds to the at least one detected emitted signal to the at least one detecting sensor during the defined time interval; and
(b) perform the action with respect to data indicative of an entire data of the frequency band received by the at least one non-detecting sensor during a corresponding defined time interval, the action corresponding to the at least one emitted signal received by the at least one non-detecting sensor during the corresponding defined time interval.

14. The system of claim 13, wherein the assistance information comprises at least one instruction for saving of data received by the at least one non-detecting sensor during the corresponding defined time interval, indicative of the at least one emitted signal detected by the at least one detecting sensor during the defined time interval, and
wherein performing the action comprises: said saving of data, and sending at least a portion of the saved data to a system center when communication to the system center is available.

15. The system of claim 13, wherein performing the action comprises extracting, from the data indicative of the entire data of a frequency band received by the at least one non-detecting sensor during the corresponding defined time interval, data indicative of the at least one emitted signal received by the at least one non-detecting sensor during the corresponding defined time interval.

16. The system of claim 15, wherein the assistance information comprises data indicative of an entire received data sample at the at least one detecting sensor corresponding to the at least one emitted signal detected by the at least one detecting sensor.

17. The system of claim 15, wherein the assistance information comprises at least one set of parameter values corresponding to the least one detected emitted signal, wherein said extracting data indicative of the at least one emitted signal comprises determining at least a Time of Arrival (TOA) value of the at least one emitted signal at the at least one non-detecting sensor, said at least the Time of Arrival of the at least one emitted signal constituting data indicative of at least one emitted signal received by the at least one non-detecting sensor during the corresponding defined time interval.

18. The system of claim 15, wherein the extracting of the data indicative of the at least one emitted signal by the at least one non-detecting sensor can be performed without the at least one non-detecting sensor being required to buffer data samples until communication to the system center is available.

19. The system of claim 13, wherein step (a) is further performed for at least a next defined time interval.

20. A system capable of performing an action associated with a received signal, comprising: a sensor, the sensor comprising a processing circuitry and configured to:
(a) responsive to receiving by at least one detecting sensor, during a defined time interval, data indicative of an entire data of a frequency band received by the at least one detecting sensor during the defined time interval, comprising at least one signal emitted by at least one emitter, and to detecting of the at least one emitted signal by the at least one detecting sensor,
sending from the at least one detecting sensor assistance information corresponding to the at least one emitted signal detected by the at least one detecting sensor during the defined time interval, to at least one system center,
wherein the assistance information is capable of being utilized by the at least one system center to send second assistance information to at least one non-detecting sensor,
wherein the second assistance information is capable of being utilized by the at least one non-detecting sensor to perform an action with respect to data indicative of an entire data of the frequency band received by the at least one non-detecting sensor during a corresponding defined time interval, the action corresponding to the at least one emitted signal received by the at least one non-detecting sensor during the corresponding defined time interval.

* * * * *